(12) United States Patent
Jung et al.

(10) Patent No.: US 10,771,854 B2
(45) Date of Patent: *Sep. 8, 2020

(54) VIDEO STREAMING APPARATUS AND METHOD IN ELECTRONIC DEVICE

(71) Applicant: Samsung Electronics Co., Ltd, Suwon-si (KR)

(72) Inventors: Ha-Kyung Jung, Seoul (KR); Hyun-Joo Lee, Seoul (KR); Jin-Hyoung Kim, Seongnam-si (KR); Jiangwei Xu, Suwon-si (KR); Jin-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

This patent is subject to a terminal disclaimer.

(21) Appl. No.: 16/082,523

(22) PCT Filed: Mar. 3, 2017

(86) PCT No.: PCT/KR2017/002350
§ 371 (c)(1),
(2) Date: Sep. 5, 2018

(87) PCT Pub. No.: WO2017/155251
PCT Pub. Date: Sep. 14, 2017

(65) Prior Publication Data
US 2019/0098367 A1    Mar. 28, 2019

(30) Foreign Application Priority Data

Mar. 5, 2016 (KR) .................. 10-2016-0026696

(51) Int. Cl.
*G06F 15/16* (2006.01)
*H04N 21/61* (2011.01)
(Continued)

(52) U.S. Cl.
CPC ......... *H04N 21/6131* (2013.01); *H04L 45/24* (2013.01); *H04L 65/4084* (2013.01);
(Continued)

(58) Field of Classification Search
CPC ....... H04L 45/24; H04L 45/121; H04L 67/06; H04L 43/0864; H04L 43/16;
(Continued)

(56) References Cited

U.S. PATENT DOCUMENTS 8,670,326 B1    3/2014    Balasubramanian et al.
8,929,349 B2    1/2015    Park
(Continued)

FOREIGN PATENT DOCUMENTS

KR    10-1243737 B1    3/2013
KR    10-2013-0037574 A    4/2013
(Continued)

OTHER PUBLICATIONS

International Search Report dated May 23, 2017 in connection with International Patent Application No. PCT/KR2017/002350.
(Continued)

*Primary Examiner* — Michael A Keller
*Assistant Examiner* — Thao D Duong

(57) ABSTRACT

Disclosed is a 5G or pre-5G communication system. To this end, an electronic device transmits a request message to a server through each of a plurality of communication paths at least based on a multi-radio access technology, and receives a video segment from the server through each of the plurality of communication paths according to the request message. The electronic device estimates a transmission quality at each communication path on the basis of video segments received for each of the plurality of communication paths at a radio search point satisfying at least one preset condition. The electronic device can determine, by the transmission
(Continued)

quality estimated according to each of the plurality of communication paths and the preset reference transmission quality, one communication mode, among a plurality of communication modes, for designating at least one communication path for supporting the video streaming, among the plurality of communication paths.

15 Claims, 13 Drawing Sheets

(51) Int. Cl.
| | |
|---|---|
| *H04W 28/02* | (2009.01) |
| *H04W 88/06* | (2009.01) |
| *H04W 40/24* | (2009.01) |
| *H04N 21/238* | (2011.01) |
| *H04N 21/24* | (2011.01) |
| *H04W 40/12* | (2009.01) |
| *H04L 29/06* | (2006.01) |
| *H04L 12/707* | (2013.01) |
| *H04N 21/414* | (2011.01) |
| *H04N 21/845* | (2011.01) |
| *H04W 4/80* | (2018.01) |

(52) U.S. Cl.
CPC .......... *H04L 65/4092* (2013.01); *H04L 65/80* (2013.01); *H04N 21/238* (2013.01); *H04N 21/2402* (2013.01); *H04N 21/41407* (2013.01); *H04N 21/8456* (2013.01); *H04W 28/0205* (2013.01); *H04W 28/0231* (2013.01); *H04W 28/0236* (2013.01); *H04W 40/12* (2013.01); *H04W 40/248* (2013.01); *H04W 88/06* (2013.01); *H04W 4/80* (2018.02)

(58) Field of Classification Search
CPC . H04L 45/125; H04L 45/745; H04L 63/0428; H04L 67/1097; H04L 9/30; H04N 21/4122; H04N 21/24
See application file for complete search history.

(56) References Cited

U.S. PATENT DOCUMENTS

| | | | |
|---|---|---|---|
| 2011/0007693 A1 | 1/2011 | Frusina et al. | |
| 2011/0014892 A1* | 1/2011 | Hedman | ................ H04W 4/90 455/404.2 |
| 2011/0082951 A1 | 4/2011 | Hardy et al. | |
| 2011/0319072 A1* | 12/2011 | Ekici | ...................... H04W 48/18 455/426.1 |
| 2013/0095806 A1* | 4/2013 | Salkintzis | ............. H04L 65/601 455/414.3 |
| 2014/0171065 A1* | 6/2014 | Graessley | ............. H04W 76/18 455/426.1 |
| 2014/0286316 A1* | 9/2014 | Park | ...................... H04W 76/16 370/332 |
| 2015/0319214 A1 | 11/2015 | Yu et al. | |
| 2015/0381455 A1 | 12/2015 | Martinsen | |

FOREIGN PATENT DOCUMENTS

| | | |
|---|---|---|
| KR | 10-1468155 B1 | 12/2014 |
| WO | 2015/095196 A1 | 6/2015 |

OTHER PUBLICATIONS

Written Opinion of the International Searching Authority dated May 23, 2017 in connection with International Patent Application No. PCT/KR2017/002350.

\* cited by examiner

VIDEO STREAMING APPARATUS AND METHOD IN ELECTRONIC DEVICE

CROSS-REFERENCE TO RELATED APPLICATIONS

This application is a 371 of International Application No. PCT/KR2017/002350 filed on Mar. 3, 2017, which claims priority to Korean Patent Application No. 10-2016-0026696 filed on Mar. 5, 2016, the disclosures of which are herein incorporated by reference in their entirety.

BACKGROUND

1. Field

Various embodiments of the present disclosure relate to an apparatus and method for performing video streaming in an electronic device that supports a multi-radio access technology (multi-RAT).

2. Description of the Related Art

To satisfy the demand for wireless data, as traffic has increased since the commercialization of 4th-Generation (4 G) communication systems, efforts have been made to develop improved 5th-Generation (5 G) communication systems or pre-5G communication systems. For this reason, the 5 G communication system or the pre-5 G communication system is also called a beyond-4 G-network communication system or a post-Long Term Evolution (LTE) system.

To achieve a high data rate, implementation of the 5 G communication system in an ultra-high frequency (mm-Wave) band (e.g., a 60 GHz band) is under consideration. In the 5 G communication system, beamforming, massive multi-input multi-output (MIMO), full dimensional MIMO (FD-MIMO), an array antenna, analog beamforming, and large-scale antenna technologies have been discussed in order to alleviate propagation path loss and to increase propagation distance in the ultra-high frequency band.

For system network improvement, in the 5 G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5 G system, advanced coding modulation (ACM) schemes including frequency and quadrature amplitude modulation (FQAM), which is a combination of frequency shift keying (FSK) and quadrature amplitude modulation (QAM) as well as sliding window superposition coding (SWSC), and advanced access schemes including filter bank multi carrier (FBMC), non-orthogonal multiple access (NOMA), and sparse code multiple access (SCMA) have been developed.

Recently, a broadcasting service supporting various types of multimedia services has converged with communication technology. Such an image communication service stands on the basis of a broadband network that supports high-speed information transfer, together with an electronic device capable of fast information processing.

The electronic device supporting the image communication service may consume a lot of power due to image processing. In particular, the resolution of an image to be processed may be the main factor for determining power consumption of the electronic device in a display operation.

For example, power consumption of a portable electronic device (hereinafter, referred to as a 'portable terminal') in a display operation may increase proportional to the resolution of an image to be processed.

The increase in resolution of the image may increase the bandwidth on a link for delivering information about the image to be processed or increase storage space. For example, bandwidth used for an application processor (AP) of an electronic device to transmit a frame to a display device or bandwidth used for an electronic device to transmit multimedia data to another electronic device may increase proportional to the resolution of the display or the size of the multimedia data to be transmitted.

SUMMARY

To meet users' demands for improved display quality, electronic devices, such as portable terminals, have become capable of providing video of a high definition/large screen ($4k$ ultra high definition (UHD) level or several-Mbps level) through a streaming service.

However, changes in the wireless communication service environment, such as the emergence of unlimited data plans or the like, may increase the load of a cellular network (Long Term Evolution (LTE) network, etc.) or the power consumption of the electronic device, causing the loss of an opportunity to improve the quality of experience (QoE) of the users.

Thus, an electronic device needs a scheme for efficiently dispersing a load caused by video streaming for various multimedia services through multiple communication paths at least based on multi-radio access technology (multi-RAT).

According to various embodiments of the present disclosure, there is provided an apparatus and method for connecting video streaming through a combination of multiple communication paths at least based on multi-RAT, taking transmission efficiency into account, in an electronic device.

According to various embodiments of the present disclosure, there is provided an apparatus and method for configuring an optimal communication path combination, taking a reference download speed for video streaming into account, in an electronic device supporting multiple communication paths at least based on multi-RAT.

According to various embodiments of the present disclosure, there is provided an apparatus and method for determining a communication mode from among communication modes predefined by a communication path combination to which multi-RAT is applied, taking the transmission quality for each communication path into account, in an electronic device supporting the multi-RAT.

According to various embodiments of the present disclosure, there is provided an apparatus and method for determining a communication mode from among communication modes predefined by a communication path combination to which multi-RAT is applied, taking transmission quality and the remaining video buffer capacity for each communication path into account, in an electronic device supporting the multi-RAT.

A video streaming method in an electronic device supporting multiple communication paths at least based on a multi-RAT, according to various embodiments of the present disclosure, may include sending a request message to a server through each of the multiple communication paths and receiving a video segment from the server through each of the multiple communication paths in response to the request message; estimating transmission quality in each of the multiple communication paths based on the received video segment received through each of the multiple communication paths at a radio search time point that satisfies at least one preset condition; and determining one communication mode designating at least one communication path for supporting video streaming from among multiple communication modes designating combinations of the multiple communication paths, based on the transmission quality, estimated for each of the multiple communication paths, and a preset reference transmission quality.

An electronic device according to various embodiments of the present disclosure may include a communication interface configured to perform wireless communication with a server through multiple communication paths, at least based on multi-radio access technology, for a video streaming service, a memory in which a video segment received from the server is recorded in a designated region according to the video streaming service, and a processor configured to control the video streaming service by using multiple communication modes designating combinations of the multiple communication paths, in which the processor may be further configured to send a request message to the server through each of the multiple communication paths by using the communication interface, to receive a video segment from the server through each of the multiple communication paths in response to the request message, to estimate transmission quality in each of the multiple communication paths based on the received video segment received through each of the multiple communication paths at a radio search time point that satisfies at least one preset condition, and to determine one communication mode from among the multiple communication modes based on transmission quality estimated for each of the multiple communication paths and a preset reference transmission quality.

A computer-readable recording medium of an electronic device according to various embodiments of the present disclosure may have recorded therein a program for executing operations of sending a request message to a server through each of the multiple communication paths at least based on a multi-radio access technology and receiving a video segment from the server through each of the multiple communication paths in response to the request message, estimating transmission quality in each of the multiple communication paths based on the received video segment received through each of the multiple communication paths at a radio search time point that satisfies at least one preset condition, and determining one communication mode designating at least one communication path for supporting video streaming from among multiple communication modes designating combinations of the multiple communication paths, based on the transmission quality, estimated for each of the multiple communication paths, and a preset reference transmission quality.

According to various embodiments proposed in the present disclosure, an apparatus and method for supporting video streaming in an electronic device may reduce the load of an operator network, improve the QoE of the user, and reduce power consumption.

DETAILED DESCRIPTION

Figure 1:
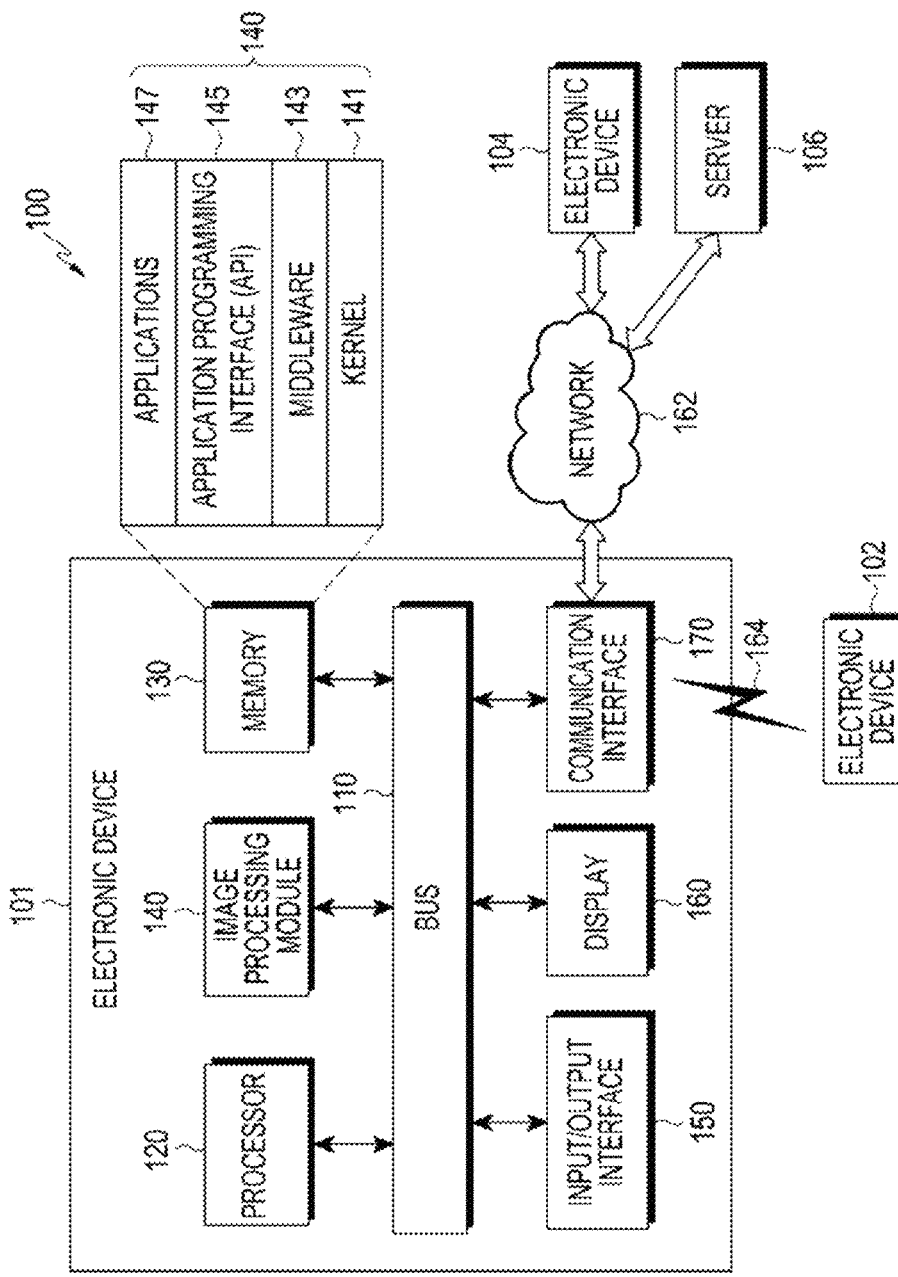
FIG. 1 is a block diagram illustrating a network environment including a wireless terminal according to proposed various embodiments.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (e.g., a first element) is "directly connected" or "directly coupled" to another element (e.g., a second element), it means that there is no intermediate element (e.g., a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HIVID), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

In some embodiments, an electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™, Play Station™, etc.), an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., water, electricity, gas, electric wave measuring devices, etc.). In various embodiments, the electronic device may be one of the above-listed devices or a combination thereof. In some embodiments, the electronic device may be a flexible electronic device. The electronic device according to various embodiments is not limited to the above-listed devices and may include new electronic devices according to technical development.

Hereinafter, an electronic device according to various embodiments of the present disclosure will be described with reference to the accompanying drawings. Herein, the term "user" may refer to a person who uses the electronic device or a device using the electronic device (e.g., an artificial intelligent (AI) electronic device).

FIG. 1 illustrates an example of a network environment according to various embodiments of the present disclosure.

Referring to FIG. 1, an electronic device 101 in a network environment may include a bus 110, a processor 120, a memory 130, an image processing module 140, an input/output (I/O) interface 150, a display 160, and a communication interface 170. In some embodiments, the electronic device 101 may not include at least one of the foregoing elements or may further include other elements.

The bus 110 may include a circuit for connecting, e.g., the elements 120 to 170 and delivering communication (e.g., a control message and/or data) between the elements 110 to 170.

The processor 120 may include one or more of a central processing unit (CPU), an application processor (AP), a communication processor (CP), or an image signal processor (ISP). The processor 120 may perform operations or data processing for control, image signal processing, and/or communication of, for example, at least one other elements of the electronic device 101. The image signal processing may include video signal processing for a video streaming service.

When the ISP is included in the processor 120, the processor 120 may be configured to control overall operations for the video streaming service by using multiple communication modes designating combinations of multiple communication paths at least based on a multi-radio access technology (multi-RAT).

According to an embodiment, the processor 120 may control the communication interface 170 to transmit a request message to the server 106 through each of the multiple communication paths and to receive a video segment from the server 106 through each communication path.

The request message transmitted through each communication path may be a message requesting video that constitutes the same multimedia content. However, the request message transmitted through each communication path may not have to request the same video segment constituting one target video.

The processor 120 may request an $m^{th}$ video segment (or video data in a first period) of target video through a first communication path and request a $n^{th}$ video segment (or video data in a second period) of the target video through a second communication path, for example. The processor 120 may determine the $m^{th}$ video segment (or the video data in the first period) and the $n^{th}$ video segment (or the video data in the second period) based on a currently used communication mode.

The first communication path may be a communication path based on a cellular network, and the second communication path may be a communication path based on a wireless local area network (WLAN). In this case, the processor 120 may receive the $m^{th}$ video segment (or the video data in the first period) of the target video through the first communication path and receive the $n^{th}$ video segment (or the video data in the second period) of the target video through the second communication path.

The processor 120 may estimate a transmission quality in each communication path based on a video segment received through each communication path at a radio search time point that satisfies at least one preset condition. The processor 120 may be configured to determine one from among multiple communication modes that are preset by a transmission quality estimated for each communication path and a preset reference transmission quality.

The currently used communication mode may be one of a single transmission mode and a multi-transmission mode. The multi-transmission mode may include the main/backup transmission mode and a merged transmission mode. In this case, the currently used communication mode may be, more specifically, one of the main/back transmission mode and the merged transmission mode.

The single transmission mode may be a transmission mode supporting video streaming through one of the multiple communication paths, the main/backup transmission mode may be a transmission mode supporting video streaming through one main communication path and one backup communication path among the multiple communication paths, and the merged transmission mode may be a transmission mode supporting video streaming through a plurality of communication paths among the multiple communication paths.

The memory 130 may include a volatile and/or nonvolatile memory. The memory 130 may store, for example, commands or data associated with at least one other elements of the electronic device 101. According to an embodiment, the memory 130 may store software and/or a program 180. The program 180 may include at least one of, for example, a kernel 181, middleware 183, an application programming interface (API) 185, and/or an application program (or "application") 187, and the like. At least some of the kernel 181, the middleware 183, and the API 185 may be referred to as an operating system (OS).

According to an embodiment, the memory 130 may store metadata and/or compressed or non-compressed image data in a region designated by the processor 120. For example, the memory 130 may store metadata as at least a part of a target image.

The memory 130 may read an image and/or metadata stored in a designated region in response to a request of the processor 120 and provide the same to the processor 120. The memory 130 may record an image re-compressed by the processor 120 in place of an existing recorded image.

When the processor 120 does not include the ISP, the electronic device 101 may separately include the image processing module 140. In this case, the image processing module 140 may perform image signal processing in place of the processor 120.

Although the image processing module 140 is illustrated as a component independent of the processor 120 and the memory 130 in FIG. 1, various embodiments are not limited thereto. The image processing module 140 may be implemented as being integrated with, for example, the processor 120, and may be implemented as software that is stored in the memory 130 and is executable by the processor 120. The image processing module 140 may be implemented by being dispersed to, for example, the processor 120 and the memory 130. In this case, an operation of generating metadata for image signal processing may be performed by the image processing module 140, and an operation of compressing the target image at least based on the generated metadata may be performed by the processor 120.

The kernel 181 may control or manage, for example, system resources (e.g., the bus 110, the processor 120, the memory 130, etc.) used to execute operations or functions implemented in other programs (e.g., the middleware 183, the API 185, or the application program 187). The kernel 181 may provide an interface through which the middleware 183, the API 185, or the application program 187 accesses separate components of the electronic device 101 to control or manage the system resources.

The middleware 183 may work as an intermediary for allowing, for example, the API 185 or the application program 187 to exchange data in communication with the kernel 181.

In addition, the middleware 183 may process one or more task requests received from the application program 187 based on priorities. For example, the middleware 183 may give a priority for using a system resource (e.g., the bus 110, the processor 120, the memory 130, etc.) of the electronic device 101 to at least one of the application programs 187. For example, the middleware 183 may perform scheduling or load balancing with respect to the one or more task requests by processing the one or more task requests based on the priority given to the at least one of the application programs 147.

The API 185 may be an interface used for the application program 187 to control a function provided by the kernel 181 or the middleware 183, and may include, for example, at least one interface or function (e.g., a command) for file control, window control, image processing or character control.

The I/O interface 150 may serve as an interface for delivering, for example, a command or data input from a user or another external device to other component(s) of the electronic device 101. The I/O interface 150 may also output a command or data received from other component(s) of the electronic device 101 to a user or another external device.

For example, the I/O interface 150 may include multiple image sensors having different characteristics. The I/O interface 150 may deliver images captured by the multiple image sensors to the image processing module 140, the memory 130, the display 160, the communication interface 170, and so forth through the bus 110. The captured images may have different image characteristics. Such a difference may be caused by variations in the characteristics of the image sensors, conditions set for capturing, and so forth.

The display 160 may include, for example, a liquid crystal display (LCD), a light emitting diode (LED) display, an organic light emitting diode (OLED) display, a microelectromechanical system (MEMS) display, or an electronic paper display. The display 160 may display, for example, various contents (e.g., a text, an image, video, an icon, a symbol, etc.). The display 160 may include a touch screen, and receives a touch, a gesture, proximity, or a hovering input, for example, by using an electronic pen or a part of a body of a user.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include, for example, short-range communication 164. The short-range communication 164 may include, for example, at least one of WiFi, Bluetooth, near field communication (NFC), magnetic stripe transmission (MST), Zigbee, or the like. The wireless communication may include, for example, GPS or global navigation satellite system (GNSS). The wired communication may include, for example, at least one of USB, a high definition multimedia interface (HDMI), recommended standard 232 (RS-232), and a plain old telephone service (POTS). The network 162 may include a telecommunications network, for example, at least one of a computer network (e.g., a local area network (LAN) or a wide area network (WAN)), Internet, and a telephone network.

According to an embodiment, the communication interface 170 may request the external electronic device 102 or 104 or the server 106 to compress the target image in response to control by the processor 120. To this end, the communication interface 170 may provide the target image and/or metadata corresponding to the target image to the external electronic device. The communication interface 170 may receive a compressed image provided from the external electronic device 102 or 104 or the server 106 and deliver the received compressed image to the processor 120.

Each of the first external electronic device 102 and the second external electronic device 104 may be a device of the same type as or a different type than the electronic device 101. According to an embodiment, the server 106 may include a group of one or more servers. According to various embodiments, some or all of operations performed by the electronic device 101 may be performed in another electronic device or a plurality of other electronic devices (e.g., the electronic device 102 or 104, or the server 106). According to an embodiment, when the electronic device 101 has to perform a function or a service automatically or at a request, the electronic device 101 may request another device (e.g., the electronic device 102 or 104 or the server 106) to perform at least some functions associated with the function or the service, instead of or in addition to executing the function or the service. The another electronic device (e.g., the electronic device 102 or 104 or the server 106) may execute the requested function or an additional function and deliver the execution result to the electronic device 101. The electronic device 101 may then process or further process the received result to provide the requested function or service. To that end, a cloud computing, distributed computing, or client-server computing technology may be used, for example.

Figure 2:
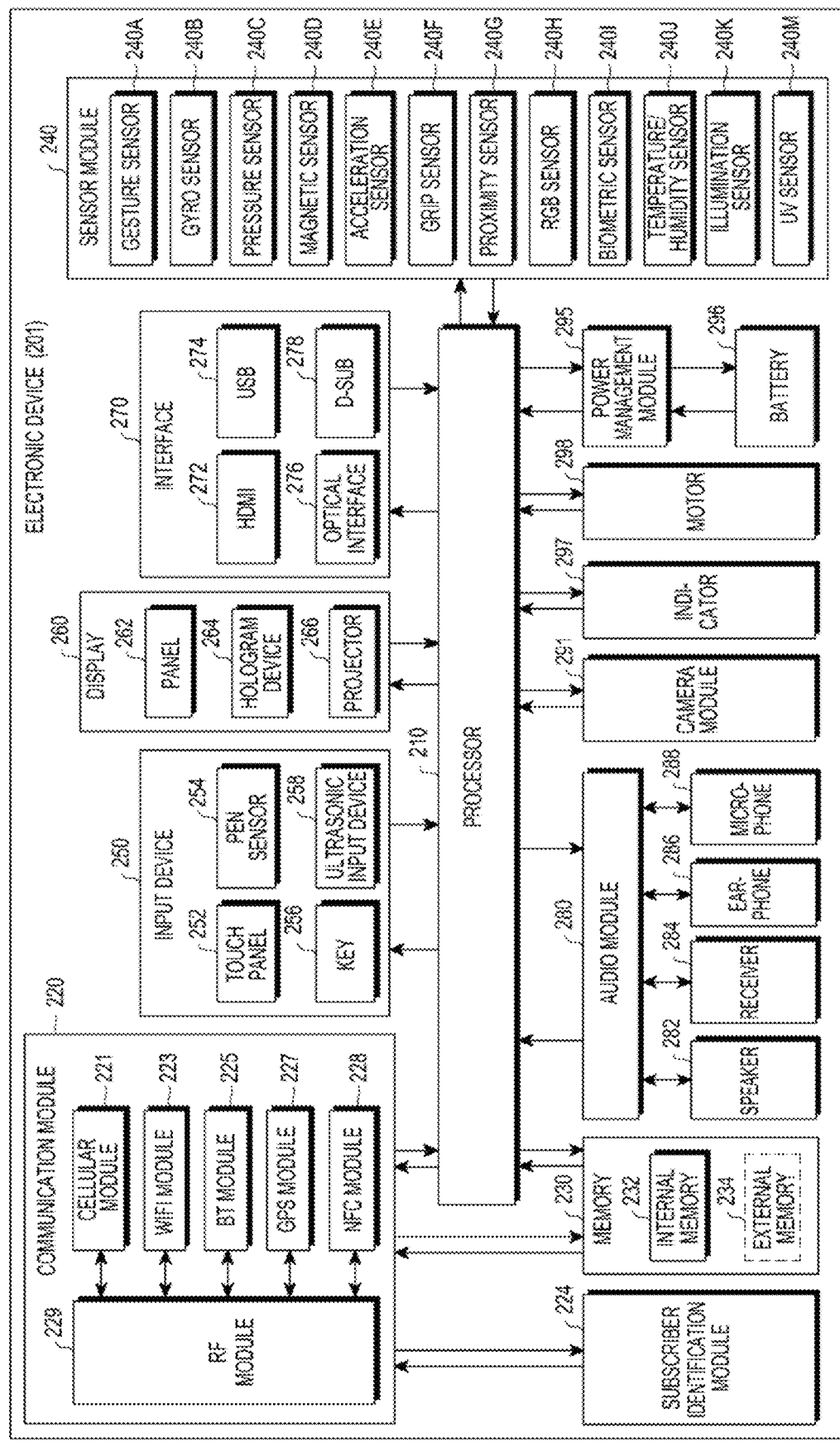
FIG. 2 is a block diagram of an electronic device according to proposed various embodiments.

FIG. 2 is a block diagram of an electronic device 201 according to various embodiments proposed in the present disclosure.

Referring to FIG. 2, the electronic device 201 may include, for example, all components or some of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software components connected to the processor 210 by driving an OS or an application program, and perform processing and operations with respect to various data. The processor 210 may be implemented with, for example, a system on chip (SoC). According to an embodiment of the present disclosure, the processor 210 may include a graphic processing unit (GPU) and/or an image signal processor. The processor 210 may include at least some of the elements illustrated in FIG. 2 (e.g., the cellular module 221). The processor 210 may load a command or data received from at least one of other elements (e.g., a non-volatile memory) into a volatile memory to process the command or data, and store various data in the non-volatile memory.

According to various embodiments proposed in the present disclosure, the processor 210 may be configured to perform all of the operations performed by the processor 120 and/or the image processing module 140 described above with reference to FIG. 1. A detailed description thereof has already been made with reference to FIG. 1, and thus a repeated description will not be provided.

The communication module 220 may have a configuration that is the same as or similar to the communication interface 170 illustrated in FIG. 1. The communication module 220 may include, for example, the cellular module 221, a WiFi module 223, a Bluetooth (BT) module 225, a GPS module 227, a near field communication (NFC) module 228, and a radio frequency (RF) module 229.

The cellular module 221 may provide, for example, a voice call, a video call, a text service, or an Internet service over a communication network. According to an embodiment, the cellular module 221 may identify and authenticate the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP).

Each of the WiFi module 223, the BT module 225, the GPS module 227, and the NFC module 228 may include a processor for processing data transmitted and received by a corresponding module. According to an embodiment, at least some (e.g., two or more) of the cellular module 221, the WiFi module 223, the BT module 225, the GPS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GPS module 227, and the NFC module 228 may transmit and receive an RF signal through the separate RF module 229.

According to an embodiment, the communication module 220 may be configured to perform the same operations as performed by the communication interface 170 in FIG. 1. That is, the communication module 220 may request an external electronic device to compress the target image in response to control by the processor 210. To this end, the communication module 220 may provide the target image and/or metadata corresponding to the target image to the external electronic device. The communication interface 220 may receive a compressed image provided from the external electronic device and deliver the received compressed image to the processor 210.

The SIM 224 may include, for example, a card including a SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The memory 230 may record the target image and/or the metadata corresponding to the target image in a designated region in response to control by the processor 210. The memory 230 may read a particular target image and/or metadata corresponding thereto in response to control by the processor 210, and provide the read target image and/or metadata to the processor 210.

The internal memory 232 may include, for example, at least one of a volatile memory (e.g., a dynamic random-access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 may, for example, measure physical quantity or sense an operation state of the electronic device 201 to convert the measured or sensed information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In an embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 may sense ultrasonic waves generated by an input means through the microphone 288 and check data corresponding to the sensed ultrasonic waves.

The display 260 may include a panel 262, a hologram device 264, or a projector 266.

The panel 262 may have a configuration that is the same as or similar to the display 160 illustrated in FIG. 1. The panel 262 may be implemented to be flexible, transparent, or wearable. The panel 262 may be configured with the touch panel 252 in one module.

According to an embodiment, the panel 262 may include at least one sensor. For example, the panel 262 may include a pressure sensor (or a force sensor). The pressure sensor may be a sensor capable of measuring a strength of a pressure of a touch by the user. The pressure sensor may be implemented integrally with the touch panel 252 or may be implemented as one or more sensors separate from the touch panel 252.

The hologram device 264 may show a stereoscopic image in the air by using interference of light. The projector 266 may display an image onto a screen through projection of light. The screen may be positioned inside or outside the electronic device 201. According to an embodiment, the display 260 may further include a control circuit for controlling the panel 262, the hologram device 264, or the projector 266.

The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may bi-directionally convert sound and an electric signal. At least some element of the audio module 280 may be included, for example, in the I/O interface 150 illustrated in FIG. 1. The audio module 280 may process sound information input or output through the speaker 282, the receiver 284, the earphone 286, or the microphone 288.

The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). That is, the camera module 291 may include multiple image sensors having different characteristics. The different characteristics may be factors for determining characteristics of a captured image and may include a type (monochrome, color, etc.), a resolution, a viewing angle, and so forth of the image.

The power management module 295 may manage power of, for example, the electronic device 201. According to an embodiment, the power management module 295 may include a power management integrated circuit (PMIC), a charger IC, the battery 296, or a fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 may display a particular state, for example, a booting state, a message state, or a charging state, of the electronic device 201 or a part thereof (e.g., the processor 210). The motor 298 may convert an electric signal into mechanical vibration or generates vibration or a haptic effect. Although not shown, the electronic device 201 may include a processing device (e.g., a GPU) for supporting a mobile TV. The processing device for supporting the mobile TV may process media data according to a standard such as digital multimedia broadcasting (DMB), digital video broadcasting (DVB), mediaFlo™, etc.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
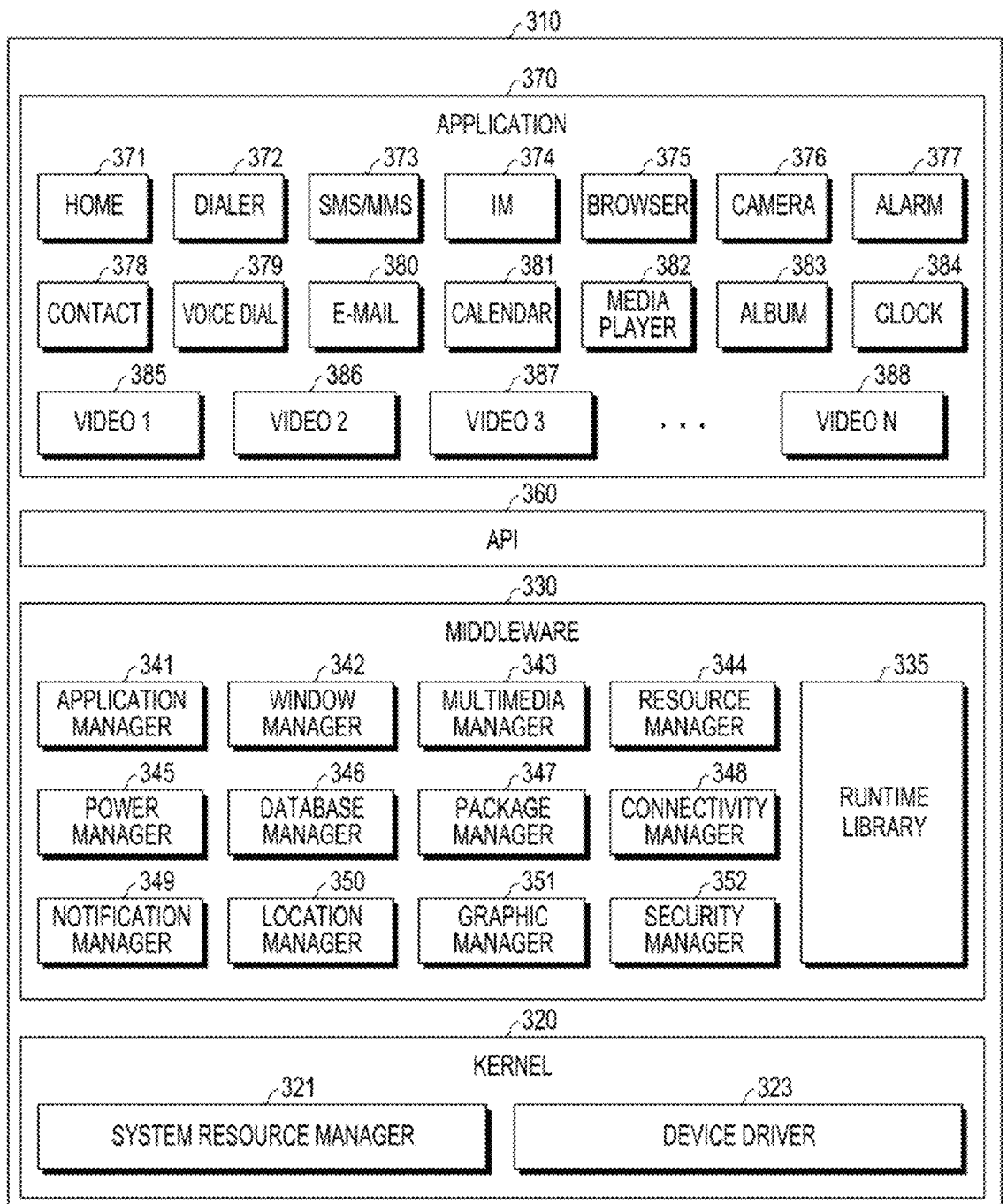
FIG. 3 is a block diagram of a programming module according to proposed various embodiments.

FIG. 3 is a block diagram of a programming module according to various embodiments of the present disclosure.

According to an embodiment, a programming module 310 (e.g., the program 180) may include an OS for controlling resources associated with an electronic device (e.g., the electronic device 101) and/or various applications (e.g., the application program 187) executed on the OS. The OS may include, for example, Android™, iOS™, Windows™, Symbian™, Tizen™, Bada™, or the like.

The programming module 310 may include, for example, a kernel 320, middleware 330, an application programming interface (API) 360, and/or an application 370. At least a part of the programming module 310 may be preloaded on an electronic device or may be downloaded from an external electronic device (e.g., the electronic device 102 or 104, or the server 106).

Examples of the kernel 320, the middleware 330, the API 360, and the application 370 included in the programming module 310 may be the kernel 181, the middleware 183, the API 185, and the application 187 included in the program 180 of FIG. 1, respectively.

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may provide functions that the applications 370 commonly require, or may provide various functions to the application 370 through the API 360 to allow the application 370 to efficiently use a limited system resource in an electronic device. The middleware 330 may be configured by a software module. The middleware 330 may be implemented in the form of a proxy or a software library.

According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352. Operations performed by the various managers may be understood as operations performed by the middleware 330. That is, components (managers) of the middleware 330 defined in the present disclosure are provided for convenience of a description, an operation based on each manager may be performed by the middleware 330, and a configuration or an implementation method of the middleware 330 is not limited by a name of each manager.

The runtime library 335 may include a library module that a compiler uses to add a new function through a programming language while the application 370 is executed. The runtime library 335 may perform functions related to an input/output, memory management, or calculation operation.

The application manager 341 may manage a life cycle of at least one application among the applications 370. The window manager 342 may manage a GUI resource used on a screen. The multimedia manager 343 may recognize a format necessary for playing various media files and perform encoding or decoding with respect to a media file by using a codec appropriate to a corresponding format. The resource manager 344 may manage a resource such as source code, a memory, or a storage space of at least one of the applications 370.

The power manager 345 may manage a battery or power, for example, in cooperation with a basic input/output system (BIOS) and provide power information necessary for an operation of the electronic device. The database manager 346 may generate, search or change a database used for at least one of the applications 370. The package manager 347 may manage the installation or update of an application distributed in a package file format.

The connectivity manager 348 may manage multiple wireless connections (communication paths) at least based on the multi-RAT supporting communication access such as, for example, cellular (LTE, etc.), WiFi, Bluetooth, or the like. The notification manager 349 may display or notify events such as arrival messages, appointments, and proximity alerts in a manner that is not disruptive to a user. The location manager 350 may manage location information of an electronic device. The graphic manager 351 may manage a graphic effect to be provided to a user or a user interface related thereto. The security manager 352 may provide a general security function necessary for system security or user authentication.

According to an embodiment, when the electronic device supports a video streaming device, the middleware 330 may further include an information gathering manager that may estimate a condition for selecting one of the multiple communication modes.

The information gathering manager may estimate, for example, a video quality in a currently used video application among multiple video applications 385, 386, 387, and 388 and/or a video quality expected to be obtained by each communication access scheme. The information gathering manager may check the amount of video data (e.g., the number of video segments, etc.) provided to each of the multiple video applications 385, 386, 387, and 388 and estimate a remaining buffer capacity corresponding to the video application based on the check result. The information gathering manager may deliver the estimated video quality and/or the estimated remaining buffer capacity to the connectivity manager 348.

The connectivity manager 348 may determine a communication mode for the video streaming service, taking into account the estimated video quality and/or the estimated remaining buffer capacity provided from the information gathering manager. That is, the connectivity manager 348 may select one of preset multiple communication modes based on the estimated video quality and/or the estimated remaining buffer capacity. The connectivity manager 348 may turn on or off a communication module (an LTE module or a WiFi module), taking the selected communication mode into account.

The connectivity manager 348 may maintain a communication path (a communication session) by activating only one of all communication modules or maintain a plurality of communication paths (a plurality of communication sessions) by simultaneously activating a plurality of communication modules.

According to the foregoing description, video data (e.g., a video segment) received from a server through at least one communication path designated by a predetermined communication mode may be delivered to a video application via the middleware 330. The request message requesting the video segment provided from the video application may be delivered to the server through at least one communication path designated by a predetermined communication mode via the middleware 330. The at least one communication path may be designated by selection of a communication module (the LTE module or the WiFi module) or by selection of a communication mode (the single transmission mode, the main/backup transmission mode, or the merged transmission mode).

The middleware 330 may include a middleware module forming a combination of various functions of the above-mentioned elements. The middleware 330 may provide modules specified according to types of an OS so as to provide distinctive functions. The middleware 330 may also delete some of existing elements or add new elements dynamically.

The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of performing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, or the multiple video applications 385, 386, 387, and 388. The application 370 may also include a health care application (e.g., for measuring the amount of exercise or a blood sugar level), an application for providing environment information (e.g., for providing air pressure, humidity, or temperature information), and so forth.

According to an embodiment, the application 370 may include an application (hereinafter, an "information exchange application" for convenience) supporting information exchange between the electronic device (e.g., the electronic device 101) and an external electronic device. The information exchange application may include, for example, a notification relay application for transferring specific information to the external electronic device or a device management application for managing the external electronic device. As an example of the information exchange application, the multiple video applications 385, 386, 387, and 388 are shown.

For example, the notification relay application may include a function for transferring notification information generated in another application (e.g., an SMS/MMS application, an e-mail application, a health care application, or an environment information application) of the electronic device to an external electronic device. The notification relay application may receive notification information from an external electronic device to provide the same to a user.

The device management application may manage (e.g., install, remove, or update) at least one function (e.g., turn-on/turn-off of an external electronic device itself (or a part thereof) or control of brightness (or resolution) of a display) of an external device communicating with the electronic device, an application operating in an external electronic device or a service (e.g., a call service or a message service) provided in the external electronic device.

According to an embodiment, the application 370 may include an application (e.g., device health care application of mobile medical equipment) designated according to an attribute of the external electronic device. According to an embodiment, the application 370 may include an application received from the external electronic device. According to an embodiment, the application 370 may include a pre-loaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include, for example, modules, programs, routines, sets of instructions, or processes for performing one or more functions.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations. The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

Figure 9:
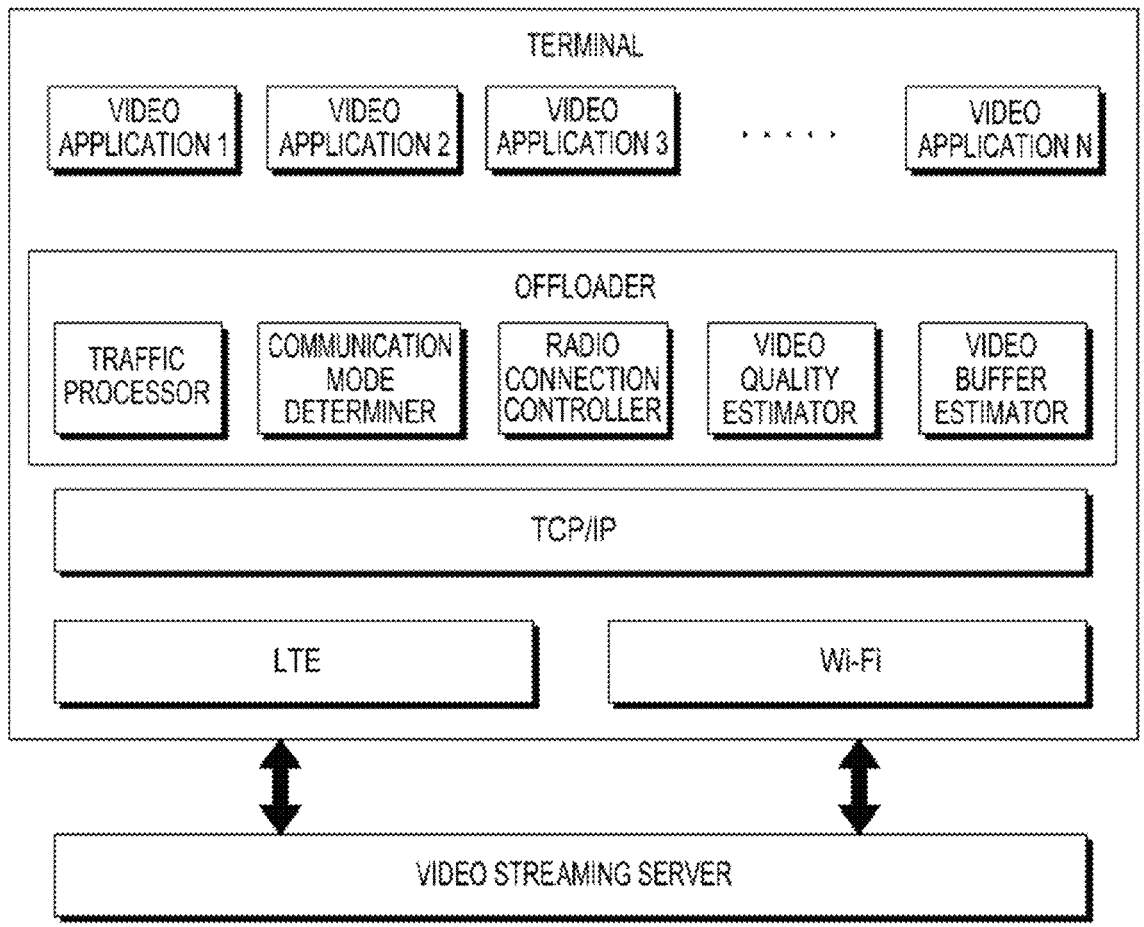
FIG. 9 is a block diagram of a software module implemented in an electronic device according to various embodiments proposed in the present disclosure.

FIG. 9 is a block diagram of a software module implemented in an electronic device according to various embodiments proposed in the present disclosure. FIG. 9 shows hardware and software modules (or functional blocks) closely related to various embodiments proposed in the present disclosure. Thus, it should be noted that in the drawings, even modules typically included in an electronic device, such as a smartphone, may not be shown if they are not directly related to the proposed embodiments.

Referring to FIG. 9, the electronic device may include multiple video applications (a video application 1, a video application 2, . . . , and a video application N) for processing video data and a software module referred to as an offloader. In the offloader may be included a traffic processor, a communication mode determiner, a radio connection controller, a video quality estimator, a video buffer estimator, and so forth, as components of the offloader. The following description of operations of the components may help in understanding the operations performed by the offloader. Meanwhile, the offloader may be included in middleware as shown in FIG. 3, but may also be implemented in an application level. For example, when the video application sends a message to the kernel, the kernel may deliver the message received from the video application to the offloader implemented in the application level.

Generally, in an electronic device, the video application may be directly connected to an external video streaming server through a communication module such as an LTE or WiFi module. In this case, a video segment request message sent from the video application to the video streaming server may be delivered to the communication module, such as the LTE or WiFi module, through a transmission control protocol (TCP)/Internet protocol (IP) stack of an operating system in the video application. The video segment to be transmitted by the video streaming server to the video application may be received by the communication module, such as the LTE or WiFi module, and then delivered to the video application through the TCP/IP stack of the operating system.

However, according to an embodiment proposed in the present disclosure, traffic of the video application may be delivered to the video streaming server through the offloader, or traffic destined to the video streaming server may be delivered to the video application through the offloader.

The offloader may be implemented in the form of a proxy or a software library. When implemented in the form of a proxy, the offloader may exist as an independent processor; when implemented in the form of a software library, the offloader may exist as a process such as a video application.

The offloader may receive the video segment request message sent by the video application and determine an optimal communication module (the LTE module or the WiFi module) or an optimal communication mode (the single transmission mode, or the main/backup transmission mode or the merged transmission mode included in the multi-transmission mode). For example, the determination of the optimal communication module or the optimal communication mode may be performed by the communication mode determiner of the offloader. The offloader may deliver the video segment request message to the video streaming server based on the previously determined optimal communication module or communication mode.

The offloader may receive the video segment to be delivered to the video application from the video streaming server based on the optimal communication module or the optimal communication mode, receive the video segment through the TCP/IP stack of the operating system, and provide the same to the video application.

The offloader may be a functional block and include a radio connection controller, a video quality estimator, a video buffer estimator, a communication mode determiner, and so forth.

The radio connection controller may perform a control function for activating (on) or deactivating (off) a communication module for transmitting/receiving a message by the traffic processor.

The video quality estimator may estimate the video quality currently used by the currently activated video application or the quality of video data (a video segment or the like) expected to be obtained through each communication module. Information about the quality estimated by the video quality estimator may be delivered to the communication mode determiner for use in determining the optimal communication mode for the traffic processor.

The video buffer estimator may examine the video segment delivered to the video application through the offloader to estimate the remaining buffer capacity for the video application. The remaining buffer capacity of the video application, estimated by the video buffer estimator, may be delivered to the communication mode determiner for use in determining the optimal communication mode for the traffic processor.

The communication mode determiner may determine the optimal communication module or communication mode, taking information about the video quality obtained from the video quality estimator and/or the remaining buffer capacity obtained from the video buffer estimator into account.

The offloader may manage the video streaming service by activating only one of all the communication modules of the terminal in order to maintain a communication session or by activating a plurality of communication modules at the same time in order to maintain a plurality of communication sessions.

The above description has been made of components included in the offloader, and operations performed by the respective components may be understood as the operations performed by the offloader. In other words, the components of the offloader defined for various embodiments proposed in the present disclosure are for the convenience of a description, and the operation of each component may also be performed by the offloader. Names of the components are not limited by a configuration or implementation scheme of the offloader.

Figure 4:
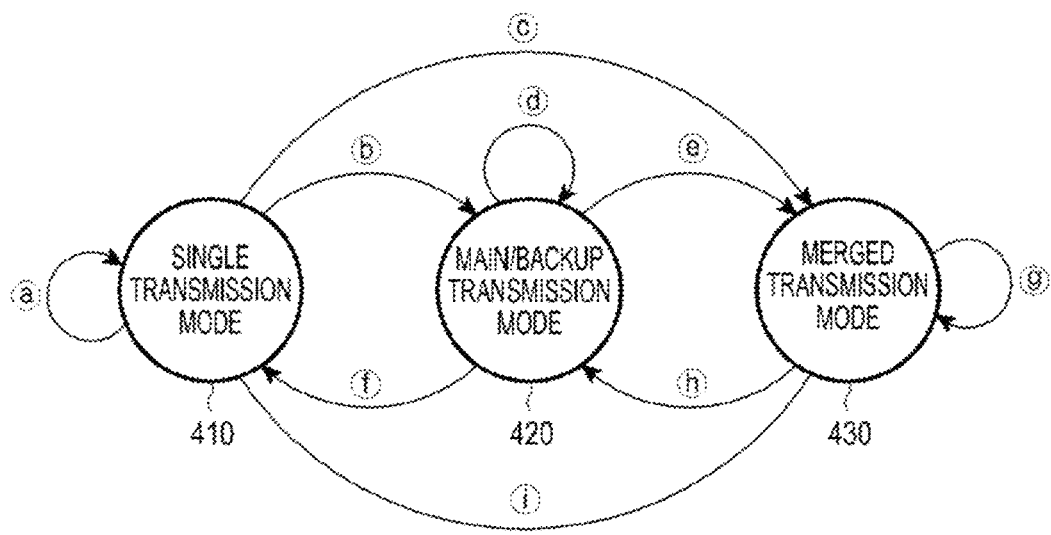
FIG. 4 shows state transition for supporting a video streaming service based on multiple communication modes in an electronic device according to various embodiments proposed in the present disclosure.

FIG. 4 shows a state transition or a state switch for supporting a video streaming service based on multiple communication modes in an electronic device according to various embodiments proposed in the present disclosure.

Referring to FIG. 4, the states of the electronic device may correspond to each of the multiple communication modes that define combinations of the multiple communication paths at least based on the multi-RAT. The multiple communication modules may include, for example, the single transmission mode, the main/backup transmission mode, and the merged transmission mode, such that the states of the electronic device may include a single transmission state 410, a main/backup transmission state 420, and a merged transmission state 430 corresponding to the respective multiple communication modes.

The state transition in the electronic device may be performed based on the result of checking if the transmission quality estimated for each of the multiple communication paths satisfies a preset reference transmission quality.

When the current operation state is the single transmission state 410, the electronic device may maintain the single transmission state 410 (indicated by (a)), switch to the main/backup transmission state 420 (as indicated by (b)), or switch to the merged transmission state 430 (as indicated by (c)).

When the current operation state is the main/backup transmission state 420, the electronic device may maintain the main/backup transmission state 420 (indicated by (d)), switch to the merged transmission state 430 (as indicated by (e)), or switch to the single transmission state 410 (as indicated by (f)).

When the current operation state is the merged transmission state 430, the electronic device may maintain the merged transmission state 430 (indicated by (g)), switch to the main/backup transmission state 420 (as indicated by (h)), or switch to the single transmission state 410 (as indicated by (i)).

The electronic device may previously set a condition for transition to an operation state, and upon the occurrence of a situation satisfying the previously set condition, switch to an operation state corresponding to the situation.

A condition for maintaining the single transmission state 410 (as indicated by (a)) or switching to the single transmission state 410 (as indicated by (f) and (i)) may include, for example, a case where an additional communication path is not connectable when one communication path is connected, or connection of one of two connected communication paths is released.

A condition for maintaining the main/backup transmission state 420 (as indicated by (d)) or switching to the main/backup transmission state 420 (as indicated by (b) and (h)) may include, for example, a case where the transmission quality measured for at least one of the two connected communication paths satisfies a preset reference transmission quality.

A condition for maintaining the merged transmission state 430 (as indicated by (g)) or switching to the merged transmission state 430 (as indicated by (c) and (e)) may include, for example, a case where the transmission quality measured for each of the two connected communication paths fails to satisfy the preset reference transmission quality.

Figure 5:
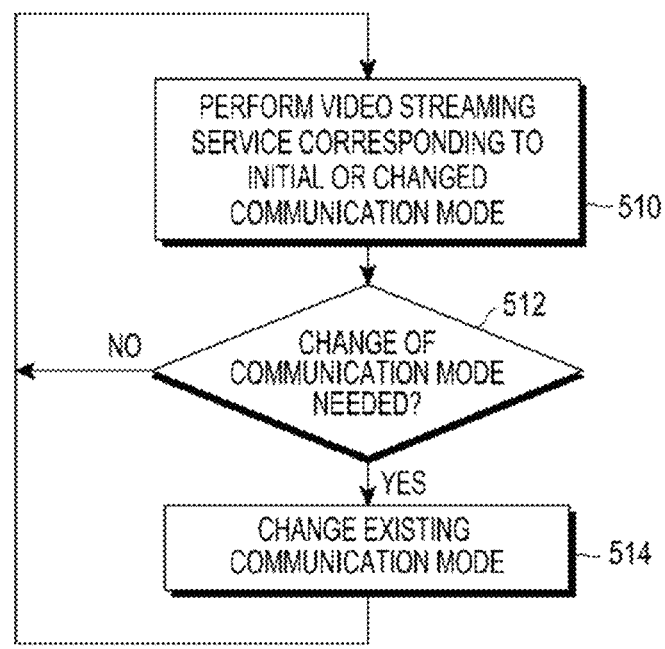
FIG. 5 is a flowchart illustrating a control flow performed by an electronic device supporting multiple communication paths at least based on multi-radio access technology (multi-RAT), according to various embodiments proposed in the present disclosure.

FIG. 5 is a flowchart illustrating a control flow performed by the electronic device supporting multiple communication paths at least based on the multi-RAT, according to various embodiments proposed in the present disclosure.

Referring to FIG. 5, the electronic device may perform a video streaming service corresponding to an initial communication mode or a changed communication mode in operation 510. The electronic device may send a request message to a server through one communication path or each of multiple communication paths. The electronic device may receive a video segment from the server through each of the multiple communication paths in response to the request message sent through each communication path. The electronic device may select one communication path or multiple communication paths through which the request message is to be sent, based on an initial communication mode or a changed communication mode.

The initial communication mode or the changed communication mode may be set to one of the predefined multiple communication modes. The multiple communication modes may include, for example, the single transmission mode and the multi-transmission mode which may include the main/backup transmission mode and the merged transmission mode. The single transmission mode may support the video streaming service through one of the multiple communication paths, the main/backup transmission mode may support the video streaming service through one main communication path and one backup communication path among the multiple communication paths, and the merged transmission mode may support the video streaming service through a plurality of communication paths among the multiple communication paths.

When the multiple communication paths include the first communication path and the second communication path, the electronic device may transmit a request message to the server through each of the first communication path and the second communication path and receive a video segment from the server through each of the first communication path and the second communication path in response to the request message, if connection to the second communication path is possible during the video streaming service in the single transmission mode using the first communication path, or connection to the first communication path is possible during the video streaming service in the single transmission mode using the second communication path.

A detailed procedure in which the electronic device executes the video streaming service in the communication mode in operation 510 will be described in more detail with reference to FIGS. 6A and 6B through 8. For example, operation 510 may include an operation in which the offloader sends the request message provided from the video application to the video streaming server, an operation in which the offloader receives the video data (the video segment) from the video streaming server in response to the sent request message, an operation in which the offloader delivers the received video segment to the video application, an operation in which the offloader estimates a transmission quality for one communication path or multiple communication paths based on the received video segment, and an operation in which the offloader checks if a change of the current communication mode is needed based on the estimated transmission quality.

The electronic device may determine whether a change of the communication mode is needed in operation 512. The electronic device may estimate a transmission quality in each communication path, determine whether the transmission quality estimated for each communication path satisfies a preset reference transmission quality, and determine whether a change of the communication mode is needed based on the determination result.

The electronic device may estimate the transmission quality in each communication path based on a video segment received through each communication path at a radio search time point that satisfies at least one preset condition. The electronic device may determine one communication mode designating at least one communication path for supporting video streaming from among multiple communication modes designating combinations of multiple communication paths, based on transmission quality, estimated for each of the multiple communication paths, and a preset reference transmission quality.

According to an embodiment, when the multiple communication paths include the first communication path and the second communication path, the electronic device may determine the merged transmission mode as a communication mode for supporting the video streaming service, if the first transmission quality estimated for the first communication path fails to satisfy a preset first reference transmission quality and the second transmission quality estimated for the second communication path fails to satisfy a preset second reference transmission quality.

When the first transmission quality satisfies the preset first reference transmission quality, the electronic device may determine the main/backup transmission mode, which uses the first communication path as the main communication path and the second communication path as the backup communication path, as the communication mode for supporting the video streaming service.

When the second transmission quality satisfies the preset second reference transmission quality, the electronic device may determine the main/backup transmission mode, which uses the second communication path as the main communication path and the first communication path as the backup communication path, as the communication mode for supporting the video streaming service.

When the multiple communication paths include the first communication path and the second communication path, the electronic device may change the communication mode from the merged transmission mode or the main/backup transmission mode to the single transmission mode using the first communication path, if the connection to the second communication path is blocked during the video streaming service in the merged transmission mode or the main/backup transmission mode.

The electronic device may change the existing communication mode into a newly determined communication mode in operation 514. Once the communication mode is changed, the electronic device may go to operation 510 to provide the video streaming service corresponding to the changed communication mode.

Herein below, a detailed description will be made of an operation to be performed by the electronic device in each communication mode, according to various embodiments proposed in the present disclosure. For convenience, the description will be made on the assumption that the subjects of all operations are the video application and the offloader. However, the operations to be described below may also be performed equally when the offloader is positioned in the application level or in the middleware.

Figure 6A:
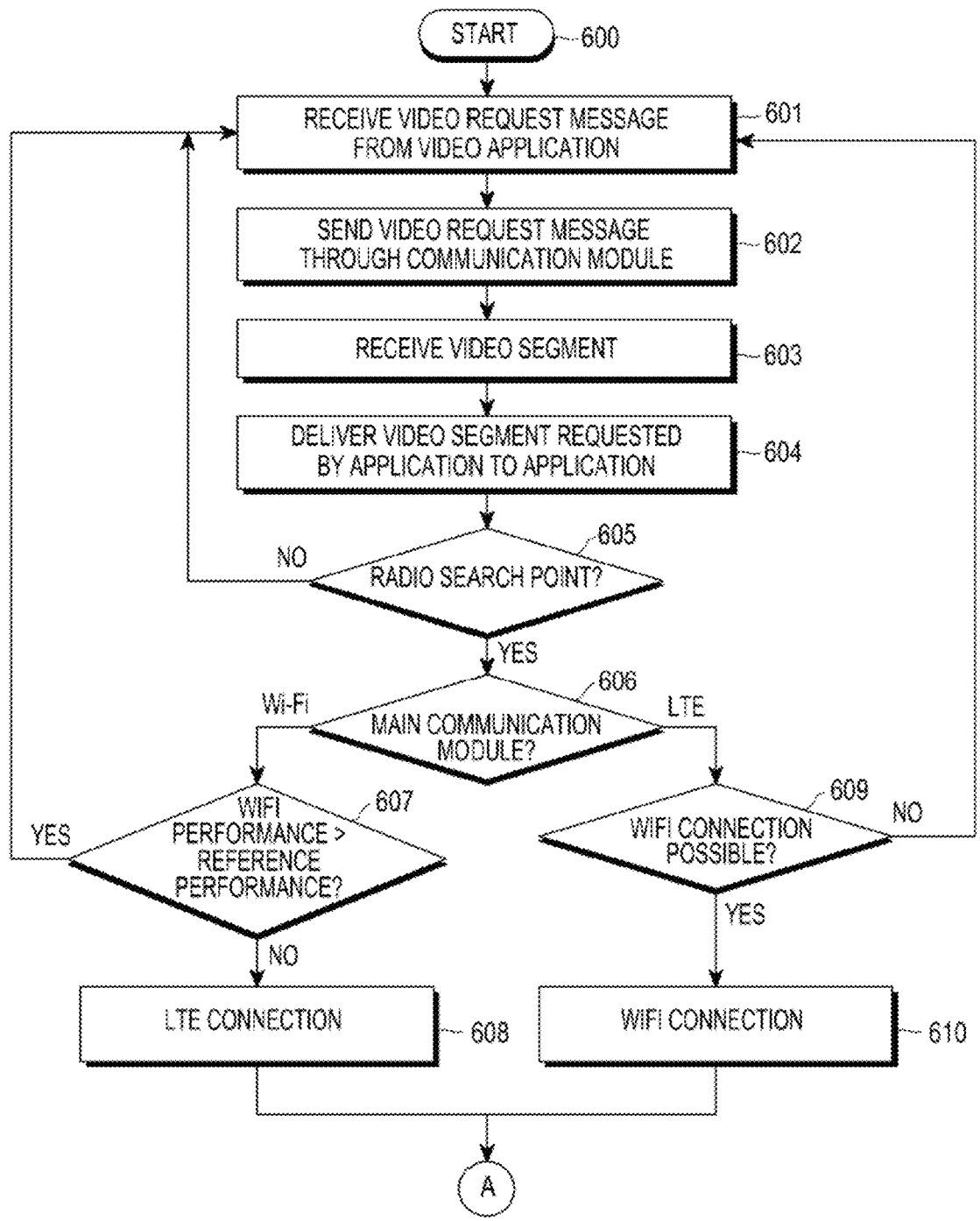
FIGS. 6A and 6B are flowcharts illustrating a control flow performed by an electronic device in a single transmission mode, according to various embodiments proposed in the present disclosure.
Figure 6B:
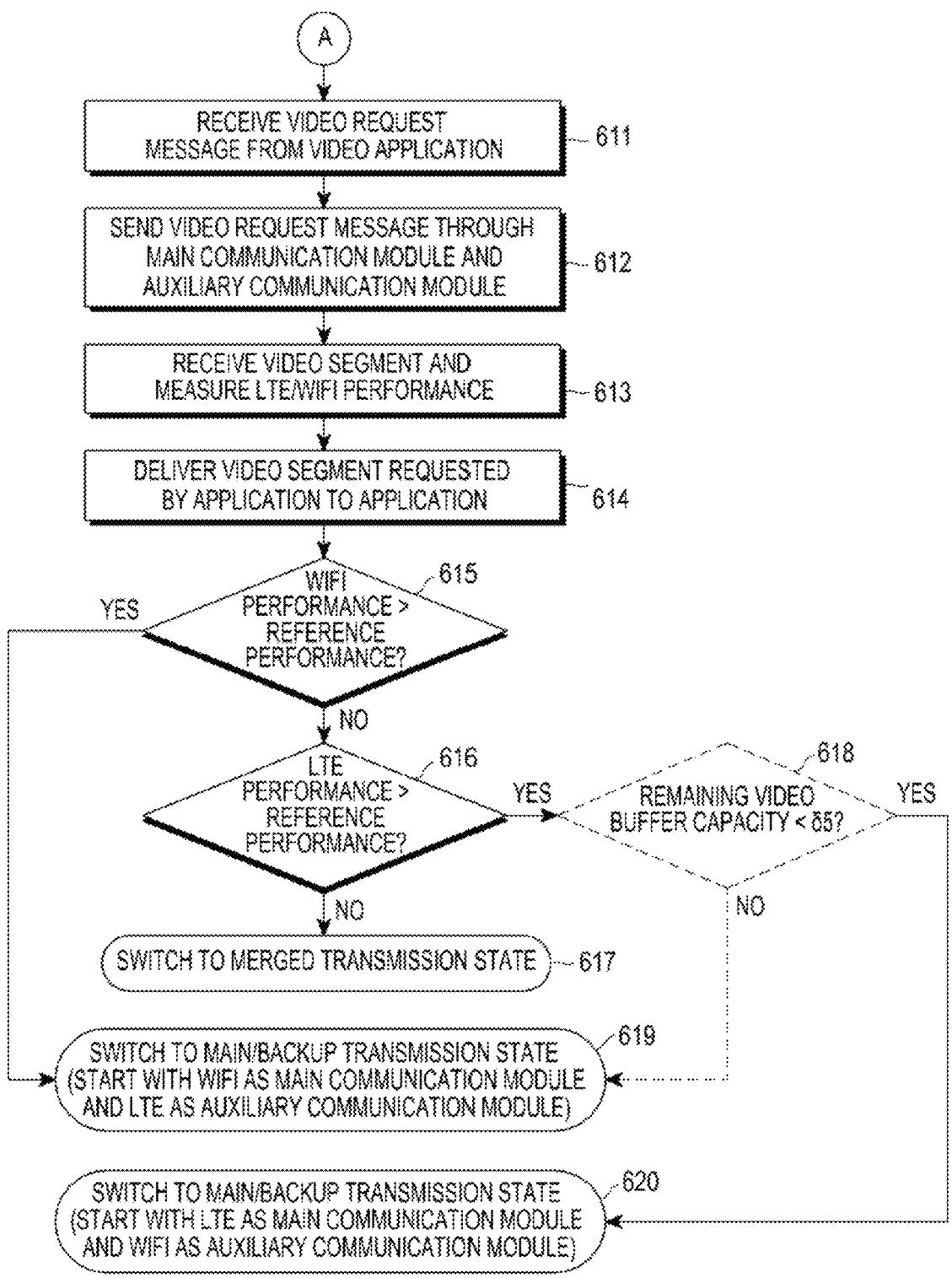

FIGS. 6A and 6B are flowcharts illustrating a control flow performed by the electronic device in the single transmission mode, according to various embodiments proposed in the present disclosure.

Referring to FIGS. 6A and 6B, the offloader of the electronic device may receive a video segment request message to be sent from the video application to the video streaming server in operation 601. In operation 602, the offloader may send the video segment request message received from the video application to the video server through a currently connected communication module. The video server may send the video segment corresponding to the request to the electronic device. In operation 603, the video segment sent from the video server may be received by the offloader through a communication module included in the electronic device. In operation 604, the offloader may perform a task such as predicting the remaining buffer capacity of the video application if necessary, and then deliver the received video segment to the video application.

In operation 605, the offloader may determine whether it is the time point to perform a radio search. The determination of whether it is a time point to perform the radio search may be performed based on a criterion including a combination of one or more of predefined conditions. The predefined conditions may include a case where a request for a video segment is generated, a case where a particular event occurs, and a case where a radio search timer has expired.

The first determination condition may be intended to perform a radio search for the first video segment. The second determination condition, that is, the occurrence of a particular event, may be implemented to check if the particular event occurs every predetermined time intervals. A type of the particular event may include one or more of the following events or a combination thereof:

first, an event where higher-definition video watching is possible when using a wireless path other than a current wireless path;

second, an event where performance (e.g., throughput, QoE) of the current wireless path is less than or equal to a reference value;

third, an event where the expected remaining video buffer capacity is less than a first threshold value;

fourth, an event where there is a connectable new Wi-Fi access point (AP);

fifth, an event where a WiFi signal (e.g., a received signal strength indicator (RSSI)) gets stronger or weaker than a reference value;

sixth, an event where an LTE signal (e.g., a reference signal received power (RSRP), a reference signal received quality (RSRQ), etc.) gets stronger or weaker than a reference value; and seventh, an event where LTE is being used and the expected remaining video buffer capacity is greater than a second threshold value.

The third determination condition, expiration of the radio search timer, may be intended to perform a radio search every predetermined time intervals even if the particular event does not occur. To this end, the radio search timer may be set by the initial streaming start and may be reset each time a radio search is performed.

When it is determining that it is the time point to perform the radio search, the offloader may go to operation 606; when it is determining that it is not the time point to perform the radio search, the offloader may go to operation 601.

When determining that the currently connected communication module is the WiFi module in operation 606, the offloader may determine whether WiFi performance is better (or greater) than a reference performance in operation 607. Herein, the performance may be a throughput (Mbps), and the video resolution available in the video application may be determined by the throughput.

The reference performance may be automatically set by the offloader based on a preset value corresponding to a communication network or service the user currently uses or may be set by a value designated by the user.

When the WiFi performance is greater than the reference performance, the offloader may go to operation 601; otherwise, the offloader may go to operation 608 to add an LTE connection. It should be noted that the WiFi connection is not released by the addition of the LTE connection.

Meanwhile, when determining that the current main communication module is the LTE module, the offloader may determine whether connecting to WiFi is possible in operation 609. When it is not possible to connect to WiFi, the offloader may go to operation 601; otherwise, the offloader may go to operation 610 to add a WiFi connection. In this case, it should be noted that the existing LTE connection is not released by the addition of the WiFi connection.

The offloader may receive another video request message from the video application in operation 611. The offloader may separately deliver a video segment request to the video streaming server through both the LTE communication module and the WiFi communication module in operation 612. The video streaming server may send a video segment to the electronic device in response to the separate video segment requests. The electronic device may receive the video segments via a mobile communication network (a cellular network) and a WiFi network, respectively. The received video segment may be received by the offloader in operation 613 before being delivered to the video application. The offloader may identify performance (e.g., a throughput) of each communication link by observing the received video segment. The offloader may determine an optimal wireless mode in the next stage by referring to the performance of each communication link. The offloader may deliver the received video segment to the video application in operation 614.

The offloader may compare the measured WiFi performance with the reference performance in operation 615. When the WiFi performance is greater than the reference performance, the offloader may go to operation 619. The offloader may perform a state transition to the main/backup transmission state in operation 619. In this case, on the plurality of wireless paths, the main/backup transmission state may start with the WiFi module as the main communication module and a cellular (e.g., LTE) module as the backup communication module.

When determining that the WiFi performance is less than or equal to the reference performance in operation 615, the offloader may go to operation 616 to compare LTE performance with the reference performance. When the LTE performance is less than or equal to the reference performance, the offloader may go to operation 617. Operation 617 may correspond to transition to the merged transmission state.

When determining that LTE performance is greater than the reference performance in operation 616, the offloader may go to operation 618 to compare an estimated remaining video buffer capacity with a reference value. When the estimated remaining video buffer capacity is greater than or equal to the reference value, the offloader may go to operation 619. The offloader may perform a state transition to the main/backup transmission state in operation 619. In this case, on the plurality of wireless paths, the main/backup transmission state may start with the WiFi module as the main communication module and the cellular (e.g., LTE) module as the backup communication module.

However, when the estimated remaining video buffer capacity is less than the reference value, the offloader may go to operation 620. The offloader may perform a state transition to the main/backup transmission state in operation 620. In this case, on the plurality of wireless paths, the main/backup transmission state may start with the cellular (e.g., LTE) module as the main communication module and the WiFi module as the backup communication module.

The remaining video buffer capacity may be estimated based on the difference between a downloaded playable time (Downloaded time) identified by the offloader during the relay of the video segment and an elapsed play time (Elapsed time) identified from the video request message of the video application.

The remaining video buffer capacity (Remaining buffer time) may be defined using Equation 1.

$$\text{Remaining buffer time} = \text{Downloaded time} - \text{Elapsed time} \quad [\text{Equation 1}]$$

In Equation 1, the downloaded playable time (Downloaded time) used to estimate the remaining video buffer capacity may be approximated by dividing the sum of the sizes of all downloaded segments (Total received bits) by a reference bit rate (Base bit rate). The remaining video buffer capacity may be defined using Equation 2.

$$\text{Downloaded time} \approx \frac{\text{Total received bits}}{\text{Base bit rate}} \quad [\text{Equation 2}]$$

In another scheme, by using a feature in which a segment of video streaming is periodically transmitted, an approximate value of the downloaded playable time may be estimated by Equation 3.

$$\text{Downloaded time} \approx \frac{\sum_i \text{Segment size}_i}{\sum_i \frac{\text{Segment size}_i}{\text{Segment request interval}_i}/i} \quad [\text{Equation 3}]$$

In Equation 3, a numerator indicates the sum of the sizes of segments received after the start of playback or after the start of searching play, and a denominator indicates the average value of a bit rate per segment.

In another scheme, by using a feature in which the size of a video streaming segment correlates with a video bit rate, an approximate value of the downloaded playable time may be estimated by Equation 4.

$$\text{Downloaded time} \approx \sum_i \frac{\text{Segment size}_i}{\text{Segment video rate}_i} \quad \text{[Equation 4]}$$

In Equation 4, a numerator indicates the sum of the sizes of segments received after the start of playback or after the start of searching play, and a denominator indicates a video bit rate of each segment.

Figure 13:
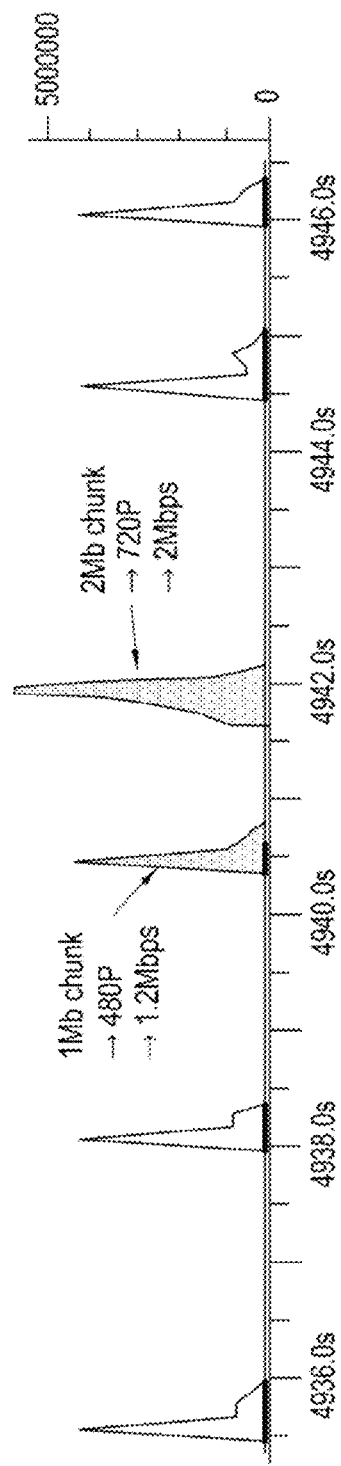
FIG. 13 shows examples for estimating a control flow performed by an electronic device in a merged transmission mode, according to various embodiments proposed in the present disclosure.

An example of the scheme defined by Equation 4 is as shown in FIG. 13.

Figure 7:
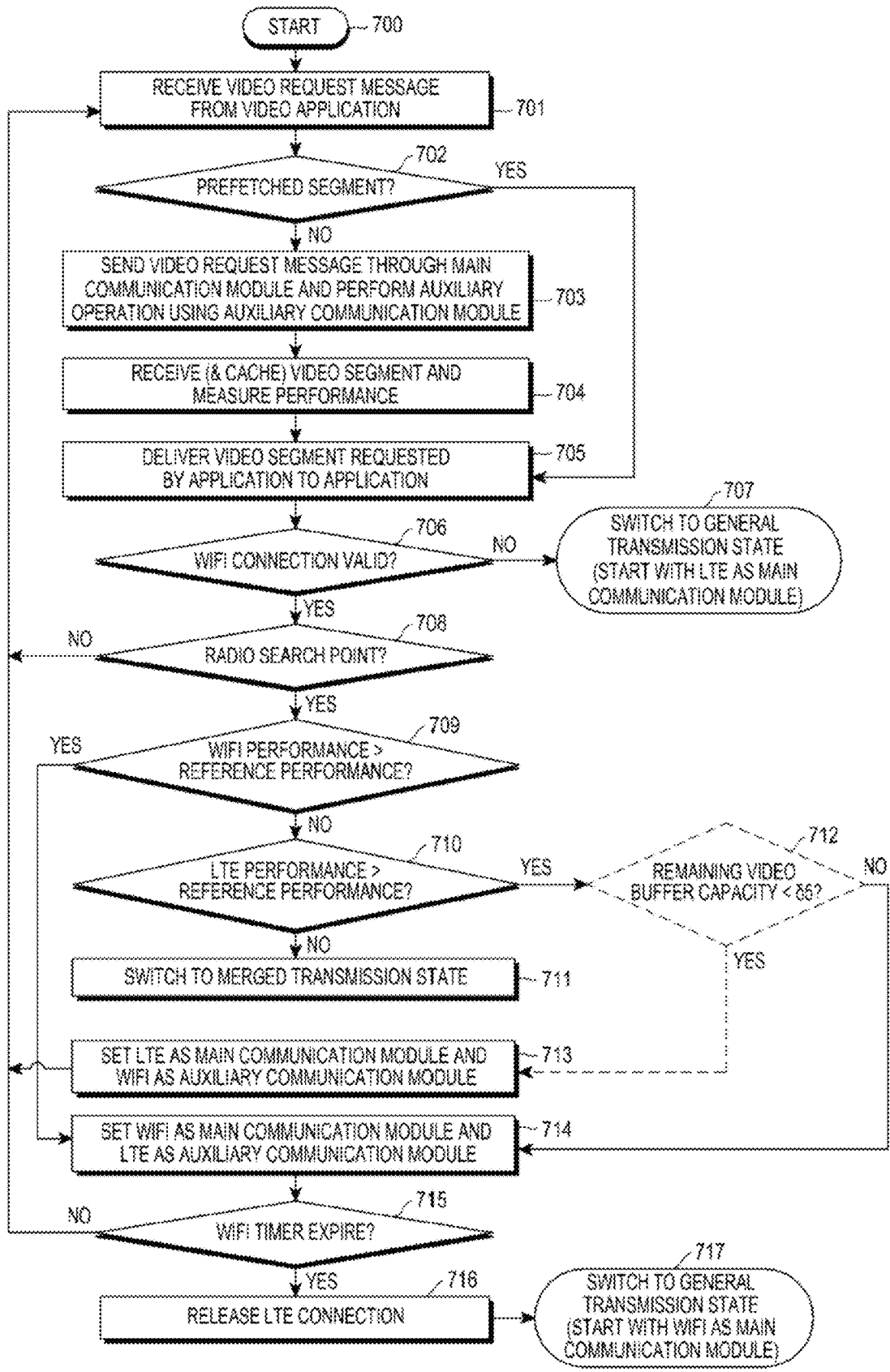
FIG. 7 is a flowchart illustrating a control flow performed by an electronic device in a main/backup transmission mode, according to various embodiments proposed in the present disclosure.

FIG. 7 is a flowchart illustrating a control flow performed by the electronic device in the main/backup transmission mode, according to various embodiments proposed in the present disclosure.

Referring to FIG. 7, the offloader of the electronic device may receive a video segment request message to be sent from the video application to the video streaming server in operation 701. The offloader may determine whether there is a prefetched video segment. The prefetched video segment may be a video segment through the backup communication path as well as a video segment received separately through the main communication path in the main/backup transmission mode.

The offloader may go to operation 705 when it has a cached video segment and may go to operation 703 when it has no cached video segment.

It would be obvious that if the received video segment is initially provided by the video application, there would be no prefetched video segment. In this case, the offloader may go to operation 703 in which the offloader may send a video request message through the main communication path (the main communication module) and perform an auxiliary operation by using the backup communication path (the backup communication module).

The auxiliary operation may be, for example, one of an operation in an idle state, an operation for prefetching, and an operation for load dispersion.

The operation in the idle state may be a standby operation (an operation of simply maintaining a session) to substitute for the main communication path. In this case, the offloader may include an operation of periodically transmitting or receiving a message of a keep-alive type with a server in order to maintain a communication session.

The operation for prefetching may correspond to an operation for receiving the video segment requested by the video application as described above. In this case, the offloader may perform a prefetching operation of previously requesting a video segment expected to be additionally requested after a video segment is delivered to the main communication module by the request message of the video application through the backup communication module.

The operation for load dispersion may correspond to an operation of receiving a part of a video segment, requested to be received through the main communication path, through the backup communication path in place of the main communication path. In this case, the offloader may adjust the ratio of the amount of data to be received through the main communication path and the amount of data to be received through the backup communication path, taking a communication environment into account. When the transmission quality of the main communication path is better than that of the backup communication path, the offloader may set the amount of data to be received through the main communication path to be larger than the amount of data to be received through the backup communication path.

The offloader may receive the video segment from the video streaming server through the main communication path and the backup communication path in operation 704. However, when the backup communication path (the backup communication module) performs an idle operation as an auxiliary operation, the video segment may not be received through the backup communication path.

When the prefetching operation is set as the auxiliary operation, the offloader may temporarily store the video segment received through the backup communication path. When the load dispersion operation is set as the auxiliary operation, the offloader may temporarily store the video segment received through the backup communication path.

According to an embodiment, the offloader may receive a video segment corresponding to the request from the video streaming server through the corresponding communication module (the main communication module) in response to the request message delivered through the main communication path in operation 704. When the auxiliary operation of the backup communication module is the prefetching operation, the offloader may have delivered the request message to the video streaming server also through the backup communication path, and may receive the video segment corresponding to the request from the video streaming server also through the backup communication path in response to the request message. In this case, the offloader may cache the video segment received for prefetching through the backup communication path for a future request from the video application.

When the operation for load dispersion is set as the auxiliary operation, the offloader may send a request message for a video segment, which has not been received through the backup communication path, to the video streaming server again through the main communication path, if reception through the main communication path is completed before reception through the backup communication path.

The offloader may estimate performance (e.g., a throughput) of each communication link by observing the video segment received through the main communication path and the backup communication path. The offloader may determine an optimal communication module or communication mode in the next stage by referring to the performance of a main communication link and a backup communication link.

The offloader may deliver the cached video segment or the received video segment according to prefetching the video application in operation 705. In operation 705, depending on a need, the offloader may deliver the received or cached video segment to the video application after performing a task such as predicting the remaining buffer capacity of the video application.

The offloader may determine whether WiFi connection is valid in operation 706. The valid WiFi connection may mean that receiving a video segment is possible. For example, the offloader may determine that the WiFi connection is not valid anymore for two cases: one in which WiFi connection is released and the other in which the WiFi connection is maintained, but a video segment may not be received during a specific time.

When a WiFi connection is no longer valid, the offloader may go to operation 707 to perform the transition to the single transmission mode, that is, a general transmission state. In this case, only an LTE communication module may be activated.

The offloader may switch to the general transmission state, not only in operation 706, but also any time when the WiFi connection is suddenly released at an arbitrary point, thereby allowing a stable video streaming service to be maintained.

When failing to completely receive a video segment allocated to WiFi due to an invalid WiFi connection, the offloader may send a request message for a part (video segment) failing to be received through LTE and receive the desired video segment correspondingly. When failing to completely receive a video segment allocated to LTE, the offloader may send a request message for a part (video segment) failing to be received through WiFi and receive the desired video segment correspondingly.

Otherwise, if the WiFi connection is valid, the offloader may determine whether it is the time point to perform a radio search in operation 708. The determination of the time to perform radio search may be performed in the same manner as in operation 601 of FIG. 6A. However, in the main/backup transmission mode, the determination of the radio search point may not be necessarily performed. That is, the determination of the radio search point in the main/backup transmission mode may be optionally applied. This is because a plurality of radio links is used at all times in the main/backup transmission mode.

When it is determining that it is the time point to perform the radio search, the offloader may go to operation 709; when it is determining that it is not the time point to perform the radio search, the offloader may go to operation 701.

The offloader may compare the measured WiFi performance with the reference performance in operation 709. When the WiFi performance is greater than the reference performance, the offloader may go to operation 714. The offloader may perform a state transition to the main/backup transmission state in operation 714. In this case, on the plurality of wireless paths, the main/backup transmission state may start with the WiFi module as the main communication module and a cellular (e.g., LTE) module as the backup communication module.

When determining that the WiFi performance is less than or equal to the reference performance in operation 709, the offloader may go to operation 710 to compare LTE performance with the reference performance. When the LTE performance is less than or equal to the reference performance in operation 710, the offloader may go to operation 711. Operation 711 may correspond to the transition to the merged transmission state.

When determining that LTE performance is greater than the reference performance in operation 710, the offloader may go to operation 712 to compare an estimated remaining video buffer capacity with a reference value. When the estimated remaining video buffer capacity is greater than or equal to the reference value, the offloader may go to operation 714. The offloader may perform a state transition to the main/backup transmission state in operation 714. In this case, on the plurality of wireless paths, the main/backup transmission state may start with the WiFi module as the main communication module and a cellular (e.g., LTE) module as the backup communication module.

However, when the estimated remaining video buffer capacity is less than the reference value in operation 712, the offloader may go to operation 713. The offloader may perform a state transition to the main/backup transmission state in operation 713. In this case, on the plurality of wireless paths, the main/backup transmission state may start with the cellular (e.g., LTE) module as the main communication module and the WiFi module as the backup communication module.

Unlike the foregoing description, operation 712 based on the remaining video buffer capacity may be skipped. In this case, when the LTE performance is greater than the reference performance, the offloader may directly go to operation 714.

The offloader may determine whether the WiFi timer has expired in operation 715. For example, the offloader may use the WiFi timer to identify a time in which the WiFi module is maintained normally as the main communication module. In this case, the WiFi timer may be set at a point in which the WiFi module is initially set as the main communication module. When the WiFi timer has expired, the offloader may regard the video streaming service as being smoothly supported merely by the WiFi module, and release the LTE connection in operation 716.

When the LTE connection is released, the offloader may switch to the general transmission state using the WiFi module as the main communication module in operation 717. When the WiFi timer has not expired, the offloader may go to operation 701.

Figure 8:
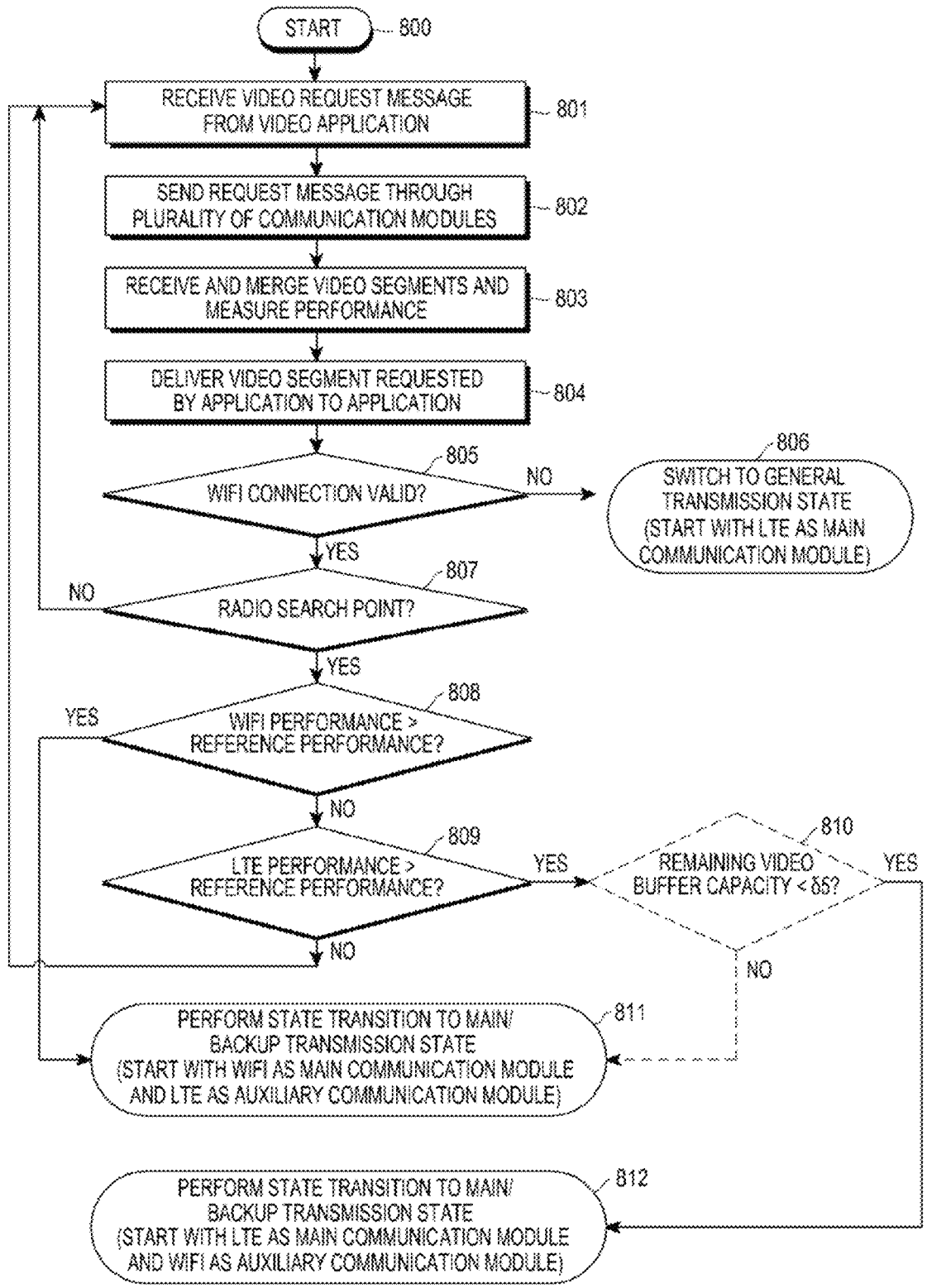
FIG. 8 is a flowchart illustrating a control flow performed by an electronic device in a merged transmission mode, according to various embodiments proposed in the present disclosure.

FIG. 8 is a flowchart illustrating a control flow performed by an electronic device in a merged transmission mode, according to various embodiments proposed in the present disclosure.

Referring to FIG. 8, the offloader of the electronic device may receive a video segment request message to be sent from the video application to the video streaming server in operation 801.

The offloader may analyze the video segment request message to be sent to the video application through both of two communication modules (the WiFi communication module and the LTE communication module), generate two request messages by dividing the video segment request message by two-byte ranges, and send the generated two request messages to the video streaming server through the two communication modules, respectively, in operation 802.

The offloader may receive the video segment from the video streaming server through the two communication paths in operation 803. That is, the video streaming server having received the video application request message delivered by being divided by the two-byte ranges may transmit two video segments corresponding to the request to the electronic device. The offloader may sequentially receive the two video segments transmitted from the video streaming server through the two communication modules. The offloader may wait until receiving all of the two video segments and then generated the video segment requested by the video application by merging the two video segments.

The offloader may estimate performance (e.g., a throughput) of each communication link by observing the video segment received through the two communication paths. The offloader may determine an optimal communication module or communication mode in the next stage by referring to the performance of each of the two communication links.

The offloader may deliver the video segment, generated by receiving the video segments through the two communication paths and merging them, to the video application in operation 804. In operation 804, depending on a need, the offloader may deliver the merged video segment to the video application after performing a task such as predicting the remaining buffer capacity of the video application.

The offloader may determine whether the WiFi connection is valid in operation 805. The valid WiFi connection may mean that receiving a video segment is possible. For example, the offloader may determine that the WiFi connection is not valid anymore for two cases: one in which the WiFi connection is released and the other in which the WiFi connection is maintained, but a video segment may not be received for a specific time.

When the WiFi connection is not valid any longer, the offloader may go to operation 806 to perform a transition to the single transmission mode, that is, a general transmission state. In this case, only an LTE communication module may be activated.

The offloader may switch to the general transmission state, not only in operation 706, but also any time when the WiFi connection is suddenly released at an arbitrary point, thereby allowing a stable video streaming service to be maintained.

When failing to completely receive a video segment allocated to WiFi due to an invalid WiFi connection, the offloader may send a request message for a part (video segment) failing to be received through LTE and receive the desired video segment correspondingly. Although failing to completely receive a video segment allocated to LTE, the offloader may send a request message for a part (video segment) failing to be received through WiFi and receive the desired video segment correspondingly.

Otherwise, if the WiFi connection is valid, the offloader may determine whether it is the time point to perform a radio search in operation 807. The determination of the time to perform radio search may be performed in the same manner as in operation 601 of FIG. 6A. However, in the main/backup transmission mode, the determination of the radio search point may not be necessarily performed. That is, the determination of the radio search point in the main/backup transmission mode may be optionally applied. This is because a plurality of radio links is used at all times in the main/backup transmission mode.

When it is determining that it is the time point to perform the radio search, the offloader may go to operation 807; when it is determining that it is not the time point to perform the radio search, the offloader may go to operation 801.

The offloader may compare the measured WiFi performance with the reference performance in operation 808. When the WiFi performance is greater than the reference performance, the offloader may go to operation 811. The offloader may perform a state transition to the main/backup transmission state in operation 811. In this case, on the plurality of wireless paths, the main/backup transmission state may start with the WiFi module as the main communication module and a cellular (e.g., LTE) module as the backup communication module.

When determining that the WiFi performance is less than or equal to the reference performance in operation 808, the offloader may go to operation 809 to compare LTE performance with the reference performance. When the LTE performance is less than or equal to the reference performance, the offloader may go to operation 801.

When determining that LTE performance is greater than the reference performance in operation 809, the offloader may go to operation 810 to compare the estimated remaining video buffer capacity with a reference value. When the estimated remaining video buffer capacity is greater than or equal to the reference value, the offloader may go to operation 811. The offloader may perform state transition to the main/backup transmission state in operation 811. In this case, on the plurality of wireless paths, the main/backup transmission state may start with the WiFi module as the main communication module and the cellular (e.g., LTE) module as the backup communication module.

However, when the estimated remaining video buffer capacity is less than the reference value, the offloader may go to operation 812. The offloader may perform a state transition to the main/backup transmission state in operation 812. In this case, on the plurality of wireless paths, the main/backup transmission state may start with the cellular (e.g., LTE) module as the main communication module and the WiFi module as the backup communication module.

Unlike the foregoing description, operation 810 based on the remaining video buffer capacity may be skipped. In this case, when the LTE performance is better than the reference performance, the offloader may directly go to operation 812.

Figure 10:
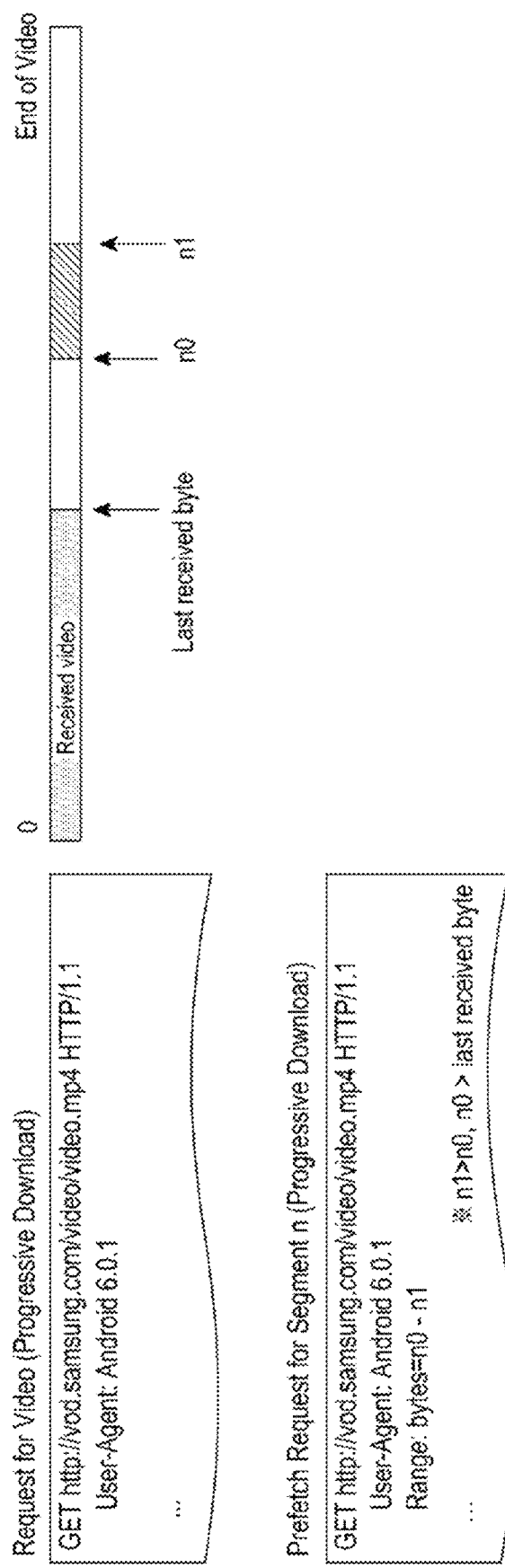
FIGS. 10 through 12 show scenarios of prefetching performed by an electronic device according to various embodiments proposed in the present disclosure.
Figure 11:
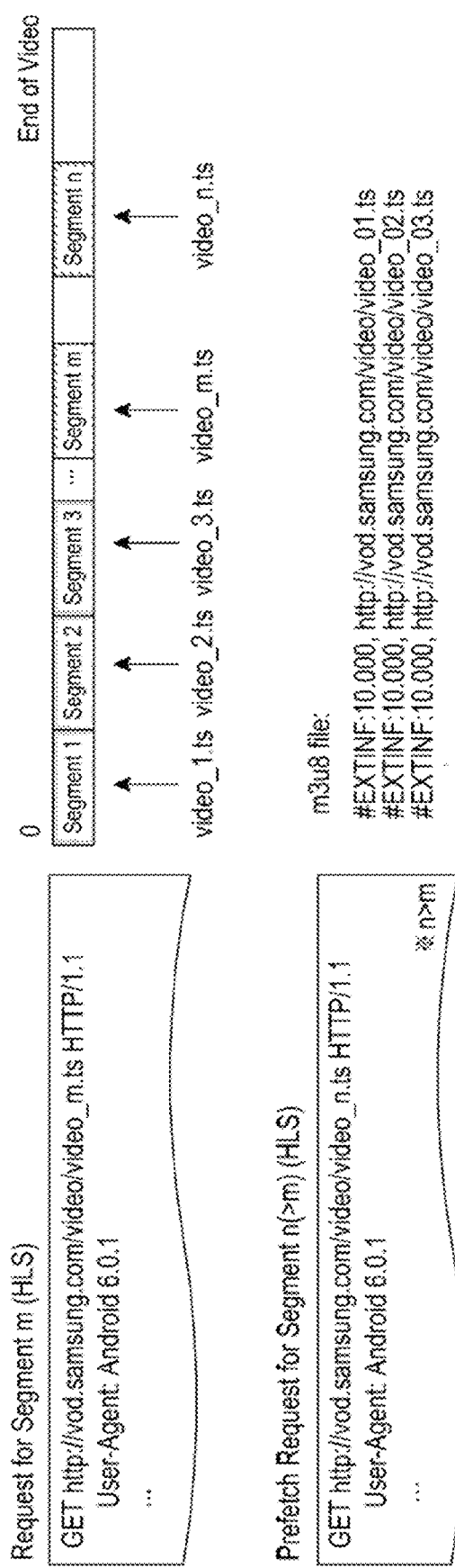
Figure 12:
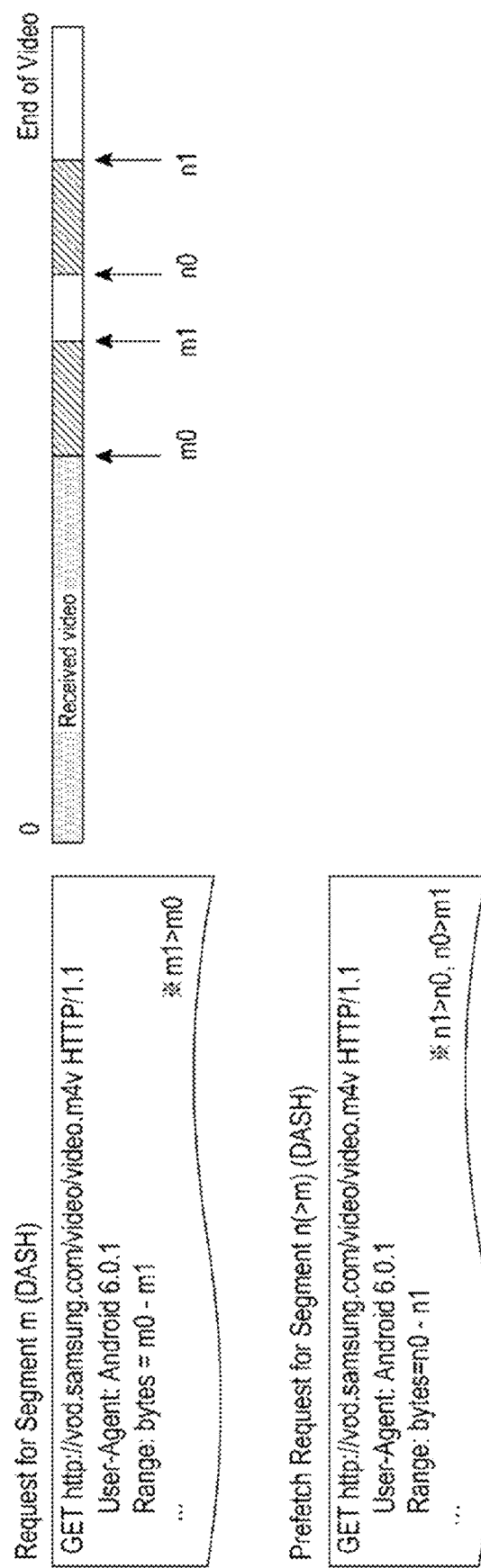

FIGS. 10 through 12 show scenarios of prefetching performed by an electronic device according to various embodiments proposed in the present disclosure.

FIG. 10 shows an example where when video content is stored by being distributed on a segment basis in the video streaming server, the electronic device may send a prefetching request for an adaptive video streaming service. This may correspond to a standard such as Http live streaming (HLS), as an example.

Generally, such a streaming scheme may generate a separate video file per video resolution, divide each resolution file into several segment units, and store them as a separate file. The name of each stored file may be identified by a serial number. Filename information of each video segment may be delivered as a separate metadata file (e.g., m3u8) in the initial stage of streaming.

The offloader may identify contents of metadata information and request in advance a video segment that has not been requested by the video application, through the backup communication module, thereby improving a user's QoE.

In FIG. 10, shaded segments in a right upper end may mean video segments that have already been received by the offloader and delivered to the video application. A segment m may mean a video segment requested to or to be requested to be delivered to the video streaming server through the main communication module in response to a request of the current video application. A segment n is a video segment having a greater serial number than the segment m, and may mean a video segment requested to be delivered to the video streaming server through the backup communication module.

In FIG. 10, by comparing a request for the segment m with a prefetching request for the segment n in the left side, a configuring method for a prefetching request of the offloader may be understood.

FIG. 11 shows an example where when video content is stored as one file in the video streaming server, a prefetching request for an adaptive video streaming service is sent. In this case, a standard such as Dynamic Adaptive Streaming over HTTP (DASH) may be an example.

Generally, such a streaming scheme stores a separate video file for each video resolution in the server and does not divide the file. The video application sends a download request by indicating the byte range of a segment in a request message (e.g., an HTTP format). The offloader may generate a request message indicating the byte range, which has not been requested through the main communication module, through the backup communication module, and send the message to the video streaming server, thereby improving QoE.

In FIG. 11, a shaded byte range in a right upper end may mean video segments that have already been received by the offloader from the video streaming server and have been delivered to the video application. A segment (segment m) indicated in a byte range m0-m1 may mean a video segment for which a request has been delivered or is to be delivered to the video streaming server through the main communication module in response to a request of the current video application. A segment (segment n) indicated in a byte range n0-n1 may mean a video segment for which a request is to be delivered to the video streaming server through the backup communication module by the offloader.

In FIG. 11, by comparing a request for the segment m with a prefetching request for the segment n in the left side, the configuring method for a prefetching request of the offloader may be understood.

FIG. 12 shows an example where a prefetching request for a video streaming service is sent based on a progressive download scheme.

Generally, such a streaming scheme functions such that video is stored with a single resolution as one file in the video streaming server and the video application initially requests the entire video, releases connection depending on a situation, and again sends a request indicating the byte range. The offloader may generate a request message indicating the byte range, which has not been received through the main communication module, through the backup communication module, and send the message to the video streaming server through the backup communication module, thereby improving QoE.

In FIG. 12, a shaded byte range in the right upper end may mean a video byte region received in the offloader through the main communication module, and dashed byte regions may mean byte regions requested for prefetching.

In FIG. 12, by comparing a video request with a prefetching request for the segment n in the left side, a configuring method for the prefetching request of the offloader may be understood.

Meanwhile, a detailed embodiment has been provided in the detailed description of the present disclosure, but those of ordinary skill in the art may also carry out various modifications without departing from the range of various embodiments proposed in the present disclosure. Therefore, the scope of the present disclosure should be defined by the appended claims and the equivalents thereof, rather than by the described embodiments. Moreover, such modified embodiments should not be understood separately from the technical spirit or prospect of the present disclosure.

The invention claimed is:

1. A video streaming method in an electronic device supporting multiple communication paths at least based on a multi-radio access technology, the video streaming method comprising:
    sending a request message to a server through each of the multiple communication paths and receiving a video segment from the server through each of the multiple communication paths in response to the request message;
    estimating a transmission quality in each of the multiple communication paths based on the received video segment received through each of the multiple communication paths;
    determining one communication mode designating at least one communication path for supporting video streaming from among multiple communication modes, based on the transmission quality, estimated for each of the multiple communication paths, and a preset reference transmission quality,
    wherein the multiple communication modes comprise a single transmission mode for supporting video streaming through one of the multiple communication paths, a main/backup transmission mode for supporting video streaming by using a first communication path as a main communication path and a second communication path as a backup communication path, and a merged transmission mode for supporting video streaming through two or more communication paths among the multiple communication paths; and
    performing prefetching with respect to the video segment by using the backup communication path in case of serving video streaming by using the main communication path in the main/backup transmission mode.

2. The video streaming method of claim 1, further comprising changing a current communication mode into the determined communication mode in case that the current communication mode is different from the determined communication mode.

3. The video streaming method of claim 1, wherein determining the one communication mode comprises:
    determining the merged transmission mode as a communication mode for supporting a video streaming service, in case that a first transmission quality estimated for the first communication path fails to satisfy a preset first reference transmission quality and a second transmission quality estimated for the second communication path fails to satisfy a preset second reference transmission quality; and
    in case that the first transmission quality satisfies the preset first reference transmission quality, determining the main/backup transmission mode, which uses the first communication path as the main communication path and the second communication path as the backup communication path, as the communication mode for supporting the video streaming service.

4. The video streaming method of claim 1, further comprising changing the communication mode from the merged transmission mode or the main/backup transmission mode to the single transmission mode using the first communication path, in case that connection to the second communication path is blocked while serving video streaming in the merged transmission mode or the main/backup transmission mode.

5. The video streaming method of claim 1, wherein the receiving of the video segment comprises:
    sending a request message to the server through each of the first communication path and the second communication path and receiving a video segment from the server through each of the first communication path and the second communication path in response to the request message, in case that connection to the second communication path is possible while serving video streaming in the single transmission mode using the first communication path, or connection to the first communication path is possible while serving video streaming in the single transmission mode using the second communication path.

6. An electronic device, comprising:
    a communication interface configured to perform wireless communication with a server through multiple communication paths at least based on a multi-radio access technology, for a video streaming service;
    a memory in which a video segment received from the server is recorded in a designated region according to the video streaming service; and a processor configured to control the video streaming service by using multiple communication modes,
wherein the processor is further configured to:
send a request message to the server through each of the multiple communication paths by using the communication interface,
receive a video segment from the server through each of the multiple communication paths in response to the request message,
estimate a transmission quality in each of the multiple communication paths based on the received video segment received through each of the multiple communication paths,
determine one communication mode from among the multiple communication modes based on a transmission quality estimated for each of the multiple communication paths and a preset reference transmission quality, wherein the multiple communication modes comprise a single transmission mode for supporting video streaming through one of the multiple communication paths, a main/backup transmission mode for supporting video streaming by using a first communication path as a main communication path and a second communication path as a backup communication path, and a merged transmission mode for supporting video streaming through two or more communication paths among the multiple communication paths, and
perform prefetching with respect to the video segment by using the backup communication path in case of serving video streaming by using the main communication path in the main/backup transmission mode.

7. The electronic device of claim 6, wherein the processor is further configured to change a current communication mode into the determined communication mode in case that the current communication mode is different from the determined communication mode.

8. The electronic device of claim 6, wherein the processor is further configured to:
determine the merged transmission mode as a communication mode for supporting the video streaming service, in case that a first transmission quality estimated for the first communication path fails to satisfy a preset first reference transmission quality and a second transmission quality estimated for the second communication path fails to satisfy a preset second reference transmission quality, and
in case that the first transmission quality satisfies the preset first reference transmission quality, determine the main/backup transmission mode, which uses the first communication path as the main communication path and the second communication path as the backup communication path, as the communication mode for supporting the video streaming service.

9. The electronic device of claim 6, wherein the processor is further configured to change the communication mode from the merged transmission mode or the main/backup transmission mode to the single transmission mode using the first communication path, in case that connection to the second communication path is blocked while serving video streaming in the merged transmission mode or the main/backup transmission mode.

10. The electronic device of claim 6, wherein the processor is further configured to send a request message to the server through each of the first communication path and the second communication path and receive a video segment from the server through each of the first communication path and the second communication path in response to the request message, in case that connection to the second communication path is possible while serving video streaming in the single transmission mode using the first communication path, or connection to the first communication path is possible while serving video streaming in the single transmission mode using the second communication path.

11. A non-transitory computer-readable recording medium having recorded therein a program for executing operations of:
sending a request message to a server through each of multiple communication paths at least based on a multi-radio access technology and receiving a video segment from the server through each of the multiple communication paths in response to the request message;
estimating a transmission quality in each of the multiple communication paths based on the received video segment received through each of the multiple communication paths; and
determining one communication mode designating at least one communication path for supporting video streaming from among multiple communication modes, based on the transmission quality, estimated for each of the multiple communication paths, and a preset reference transmission quality, wherein the multiple communication modes comprise a single transmission mode for supporting video streaming through one of the multiple communication paths, a main/backup transmission mode for supporting video streaming by using a first communication path as a main communication path and a second communication path as a backup communication path, and a merged transmission mode for supporting video streaming through two or more communication paths among the multiple communication paths; and
performing prefetching with respect to the video segment by using the backup communication path in case of serving video streaming by using the main communication path in the main/backup transmission mode.

12. The non-transitory computer-readable recording medium of claim 11, wherein executing operations further comprises:
changing a current communication mode into the determined communication mode in case that the current communication mode is different from the determined communication mode.

13. The non-transitory computer-readable recording medium of claim 11, wherein determining the one communication mode comprises:
determining the merged transmission mode as a communication mode for supporting a video streaming service, in case that a first transmission quality estimated for the first communication path fails to satisfy a preset first reference transmission quality and a second transmission quality estimated for the second communication path fails to satisfy a preset second reference transmission quality; and
in case that the first transmission quality satisfies the preset first reference transmission quality, determining the main/backup transmission mode, which uses the first communication path as the main communication path and the second communication path as the backup communication path, as the communication mode for supporting the video streaming service.

14. The non-transitory computer-readable recording medium of claim 11, wherein the executing operations further comprises:

changing the communication mode from the merged transmission mode or the main/backup transmission mode to the single transmission mode using the first communication path, in case that a connection to the second communication path is blocked while serving video streaming in the merged transmission mode or the main/backup transmission mode.

15. The non-transitory computer-readable recording medium of claim 11, wherein receiving the video segment comprises:

sending a request message to the server through each of the first communication path and the second communication path and receiving a video segment from the server through each of the first communication path and the second communication path in response to the request message, in case that connection to the second communication path is possible while serving video streaming in the single transmission mode using the first communication path, or connection to the first communication path is possible while serving video streaming in the single transmission mode using the second communication path.

\* \* \* \* \*

UNITED STATES PATENT AND TRADEMARK OFFICE
CERTIFICATE OF CORRECTION

| | | |
|---|---|---|
| PATENT NO. | : 10,771,854 B2 | Page 1 of 1 |
| APPLICATION NO. | : 16/082523 | |
| DATED | : September 8, 2020 | |
| INVENTOR(S) | : Ha-Kyung Jung et al. | |

It is certified that error appears in the above-identified patent and that said Letters Patent is hereby corrected as shown below:

On the Title Page

Item [*] delete the statement "This patent is subject to a terminal disclaimer."

Signed and Sealed this
Twentieth Day of October, 2020

Andrei Iancu
*Director of the United States Patent and Trademark Office*